United States Patent
Jeon

(10) Patent No.: US 10,757,335 B2
(45) Date of Patent: Aug. 25, 2020

(54) MOBILE TERMINAL

(71) Applicant: LG ELECTRONICS INC., Seoul (KR)

(72) Inventor: Hyunjoo Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 288 days.

(21) Appl. No.: 15/680,602

(22) Filed: Aug. 18, 2017

(65) Prior Publication Data

US 2019/0020823 A1 Jan. 17, 2019

(30) Foreign Application Priority Data

Jul. 17, 2017 (KR) .................. 10-2017-0090178

(51) Int. Cl.
| | |
|---|---|
| H04N 5/232 | (2006.01) |
| G06F 3/0482 | (2013.01) |
| G06F 3/0484 | (2013.01) |
| G06F 3/0488 | (2013.01) |
| G06K 9/00 | (2006.01) |
| G06K 9/32 | (2006.01) |
| H04M 1/725 | (2006.01) |
| G06K 9/20 | (2006.01) |
| G06F 3/0485 | (2013.01) |
| G06F 3/041 | (2006.01) |

(52) U.S. Cl.
CPC ....... *H04N 5/23296* (2013.01); *G06F 3/0482* (2013.01); *G06F 3/0488* (2013.01); *G06F 3/04847* (2013.01); *G06K 9/00335* (2013.01); *G06K 9/00671* (2013.01); *G06K 9/2081* (2013.01); *G06K 9/3233* (2013.01); *H04M 1/72522* (2013.01); *H04N 5/23216* (2013.01); *G06F 3/041* (2013.01); *G06F 3/0485* (2013.01); *G06F 2203/04104* (2013.01); *G06F 2203/04105* (2013.01); *H04M 2250/52* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,339,480 | B2 * | 12/2012 | Lee .................... | H04N 1/00307 348/240.99 |
| 8,723,988 | B2 * | 5/2014 | Thorn .................. | G06F 3/0488 348/240.99 |
| 9,185,352 | B1 * | 11/2015 | Jacques ................ | H04N 7/18 |
| 9,454,230 | B2 * | 9/2016 | Matsuki ................ | G02B 7/36 |
| 2004/0028263 | A1 * | 2/2004 | Sakamoto ............ | A61B 5/0071 382/128 |
| 2006/0187310 | A1 * | 8/2006 | Janson, Jr. ........... | H04N 5/2254 348/218.1 |
| 2010/0173678 | A1 * | 7/2010 | Kim .................... | H04N 5/23296 455/566 |

(Continued)

*Primary Examiner* — Nhat Huy T Nguyen
(74) *Attorney, Agent, or Firm* — KED & Associates LLP

(57) ABSTRACT

The present invention relates to a mobile terminal. The present invention recognizes a region of interest (ROI) in a preview image acquired by executing a camera and stores a capture image corresponding to the preview image and a zoomed image acquired by zooming in/out the ROI when a capture command is received. Accordingly, a zoomed in/out image and the entire image can be simultaneously acquired through a single capture command without user manipulation.

8 Claims, 37 Drawing Sheets

(56) References Cited

U.S. PATENT DOCUMENTS

| | | | |
|---|---|---|---|
| 2011/0224967 A1* | 9/2011 | Van Schaik | G06T 3/40 |
| | | | 704/2 |
| 2014/0164968 A1* | 6/2014 | Aalami | G06F 19/321 |
| | | | 715/771 |
| 2016/0073034 A1* | 3/2016 | Mukherjee | H04N 5/23293 |
| | | | 348/333.11 |

* cited by examiner (Zoom magnification x L)

(a)

(Zoom magnification x M)

(b)

(Zoom magnification x L)

(a)

(Zoom magnification x M)

(b)

(Zoom magnification x M)

(a)

(Zoom magnification x N)
(M > N)

(b)

(a)

(b)

(a)          (b)

MOBILE TERMINAL

CROSS-REFERENCE TO RELATED APPLICATION

Pursuant to 35 U.S.C § 119(a), this application claims the benefit of earlier filing date and right of priority to Korean Patent Application No. 10-2017-0090178 filed on Jul. 17, 2017, the contents of which are hereby incorporated by reference in its entirety.

BACKGROUND OF THE DISCLOSURE

1. Field of the Disclosure

The present invention relates to a mobile terminal and, more particularly, to a mobile terminal which can capture an image using a camera through a simple method and a method of controlling the same.

2. Background of the Disclosure

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

As the capabilities of cameras included in mobile terminals are improved, various image capturing functions can be executed using the cameras. When a predetermined region of a captured image is magnified, only the size of the region increases without change of the definition thereof and thus the region may not be clearly displayed.

SUMMARY OF THE DISCLOSURE

Accordingly, an object of the present invention is to address the above-noted and other problems.

An object of the present invention is to provide a mobile terminal providing a user interface by which a user can control the mobile terminal easily and efficiently and a method of controlling the same.

In addition, an object of the present invention is to provide a mobile terminal which can zoom in/out and capture a region of interest of an image interest without user manipulation when capturing the image and a method of controlling the same.

Furthermore, an object of the present invention is to provide a mobile terminal which can easily acquire a zoomed in/out image by zooming in/out a region of interest discriminated from the entire image through a single capturing operation and a method of controlling the same.

A mobile terminal according to one aspect of the present invention includes: a camera: a memory; a touchscreen configured to display a preview acquired by executing the camera; and a controller configured to recognize a region of interest (ROI) which needs to be zoomed in the preview, and when a first capture command is received, to generate a capture image corresponding to the preview in response to the first capture command and store the capture image in the memory. The capture image is stored along with a zoomed image generated by zooming in/out the focused ROI.

The controller may execute a text recognition function while the preview is displayed, and when a recognition rate of text included in the preview is lower than a predetermined value, recognize a region including the text in the preview as the ROI.

The ROI may be a region including an object corresponding to a person included in the preview when the person is smaller than a predetermined size.

The ROI may be a region including at least one object selected by touch input from at least one object included in the preview.

The ROI may include a plurality of regions in the preview.

When predetermined touch input applied to at least one region in the preview is received, the controller may recognize the region to which the touch input is applied as the ROI.

When the controller recognizes the ROI in the preview, the controller may display an indicator on the ROI.

The controller may store an image acquired by replacing the ROI with the zoomed image in the capture image in the memory.

The controller may store the capture image and the zoomed image in the memory in a discriminative manner.

The definition of the zoomed image may be identical to that of the capture image.

The definition of the zoomed image may be less than that of the capture image.

The zoomed image may be an image acquired by zooming in on the ROI in the capture image to the size of the capture image and capturing the zoomed in ROI.

The controller may execute a gallery application to display a thumbnail image of the capture image stored in the memory on the touchscreen, and when the zoomed image is stored along with the capture image, display a predetermined indicator along with the thumbnail image of the capture image.

The controller may display the capture image stored in the memory on the touchscreen, and when predetermined touch input applied to the ROI in the capture image is received, provide the zoomed image as a pop-up window.

The controller may display, on the touchscreen, the capture image captured according to the first capture command in a state in which the ROI is not recognized, and when definition of a zoomed region according to digital zooming in the capture image does not satisfy a predetermined criterion, re-execute the camera to perform autofocusing on the zoomed image.

A mobile terminal according to another aspect of the present invention includes a body; a touchscreen provided to the front side of the body, a first camera and a second camera provided to the rear side of the body and configured to capture a front view image; and a controller is configured to recognize an ROI determined to need to be zoomed while a preview acquired through the first camera is displayed on the touchscreen, to capture a first image corresponding to the preview through the first camera upon reception of a first capture command, and to capture a second image by zooming in on the ROI to the size of the preview through the second camera.

The ROI may include at least one of a text region, a region including a person and a dynamic object.

The ROI may correspond to a point to which predetermined touch input is applied on the touchscreen on which the preview is displayed.

The controller may replace the ROI in the first image with the second image and store the first image having the second image replaced with the ROI in the memory.

A method of controlling a mobile terminal according to another aspect of the present invention includes: displaying a preview acquired through a camera on a touchscreen; recognizing an ROI which needs to be zoomed in the preview; and generating a capture image corresponding to the preview in response to a first capture command and storing the capture image in a memory upon reception of the first capture command. The capture image may be stored along with a zoomed image generated by zooming in/out the focused ROI.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

With the mobile terminal and the method of controlling the same according to the present invention, the following effects are obtained.

According to the present invention, it is possible to provide a user interface by which a user can control the mobile terminal easily and efficiently. In addition, according to the present invention, it is possible to zoom in/out and capture a region of interest of an image without user manipulation when capturing the image.

Furthermore, according to the present invention, it is possible to easily acquire a zoomed in/out image by zooming in/out a region of interest discriminated from the entire image through a single capturing operation.

Moreover, according to the present invention, it is possible to more easily acquire a zoomed in/out image of a region of interest when capturing an image through a plurality of cameras divided into a camera for capturing an entire view and a camera for capturing a region of interest.

Further scope of applicability of the present invention will become apparent from the detailed description given hereinafter. However, it should be understood that the detailed description and specific examples, while indicating preferred embodiments of the invention, are given for illustration only, since various changes and modifications within the spirit and scope of the invention will become apparent to those skilled in the art from the detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE PREFERRED EMBODIMENTS

Figure 1A:
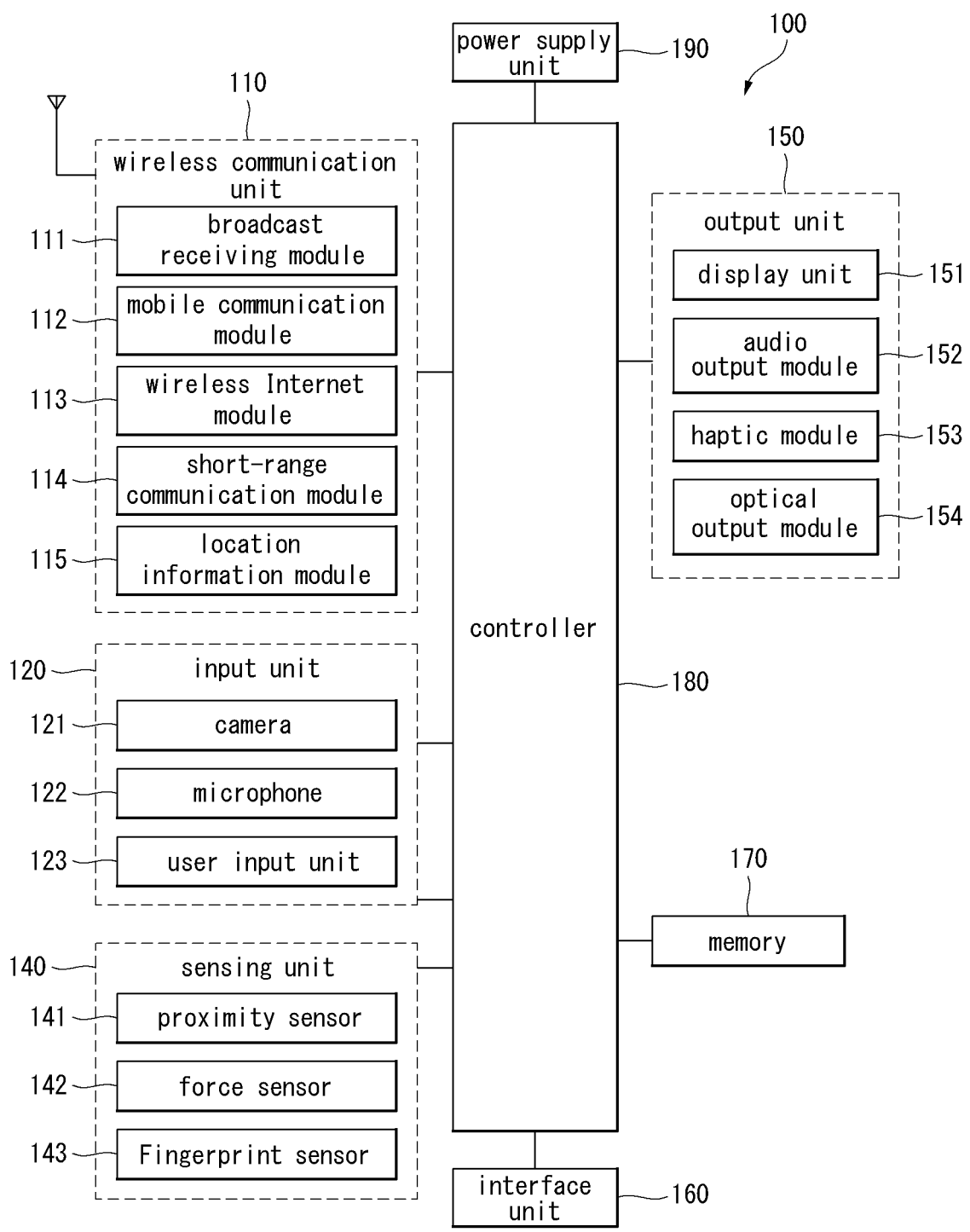
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as proximity sensor (141), illumination sensor (142), a touch sensor, an acceleration sensor (144), a magnetic sensor, a G-sensor, a gyroscope sensor (143), a motion sensor, an RGB sensor, an infrared (IR) sensor, a force sensor (145), a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1a, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 1B:
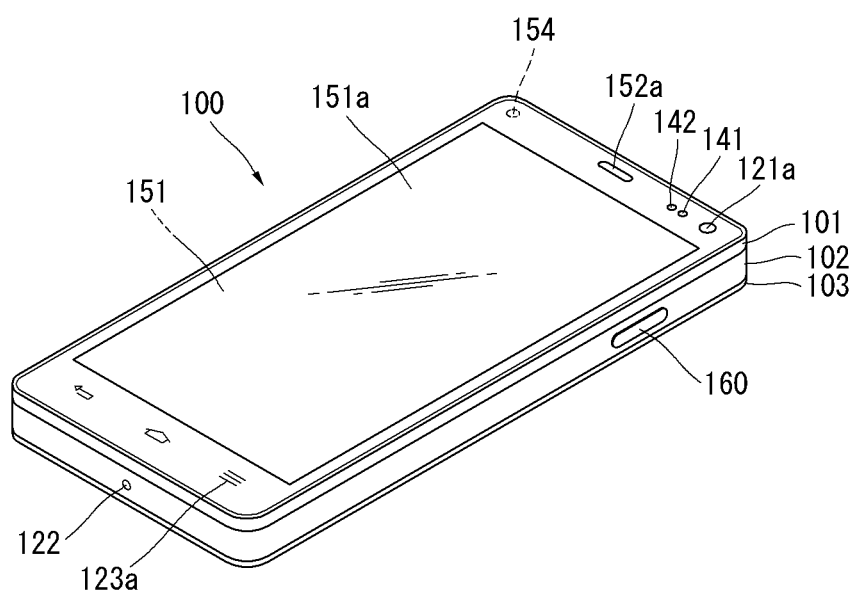
FIGS. 1B and 1C are conceptual views of one example of the mobile terminal, viewed from different directions.
Figure 1C:
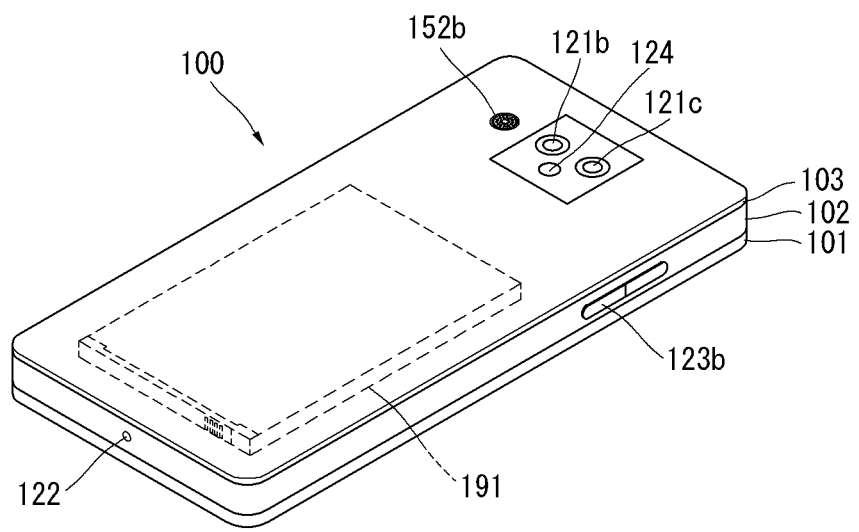

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal includes a display unit 151, a first and a second audio output modules 151a/151b, a proximity sensor 141, an illumination sensor 142, an optical output module 154, a first and a second cameras 121a/121b, a first and a second manipulation units 123a/123b, a microphone 122, interface unit 160 and the like.

It will be described for the mobile terminal as shown in FIGS. 1B and 1C. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
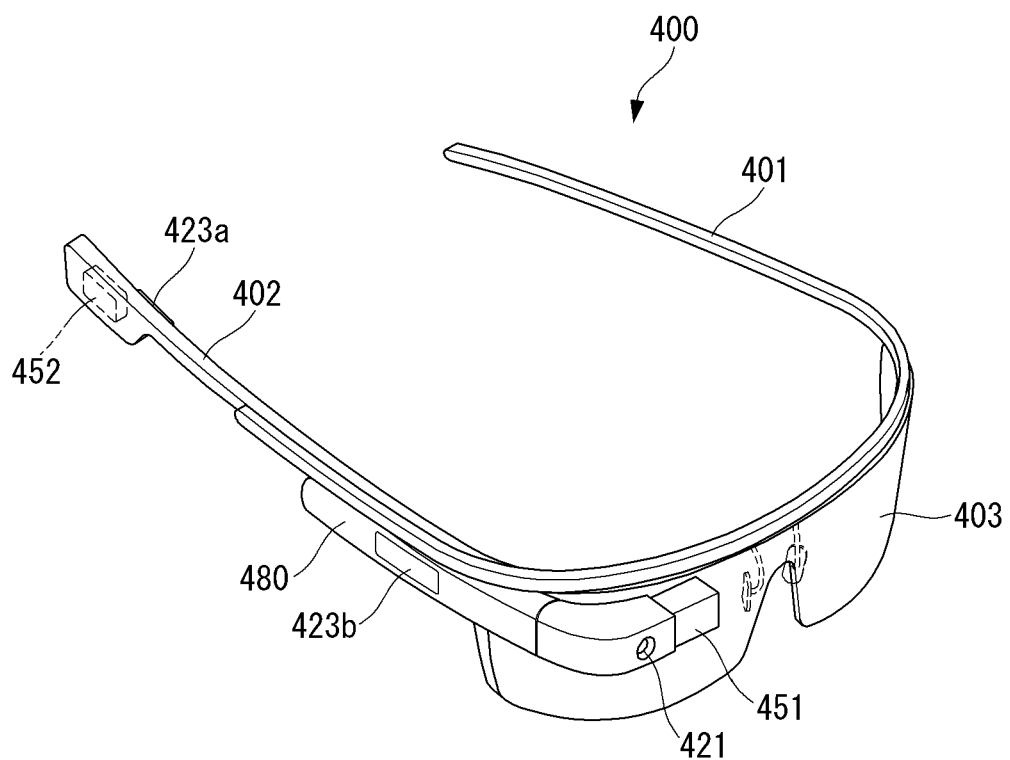
FIG. 2 is a perspective view of an example of a eye-glasses-type mobile terminal 400 according to an embodiment of the present invention.

FIG. 2 is a perspective view illustrating one example of a eyeglasses-type mobile terminal 400 according to another exemplary embodiment. The eyeglasses-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 2 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the eyeglasses-type mobile terminal 400, the display unit 451 may be located to correspond to either or both of the left and right eyes. FIG. 2 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The eyeglasses-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

Figure 3A:
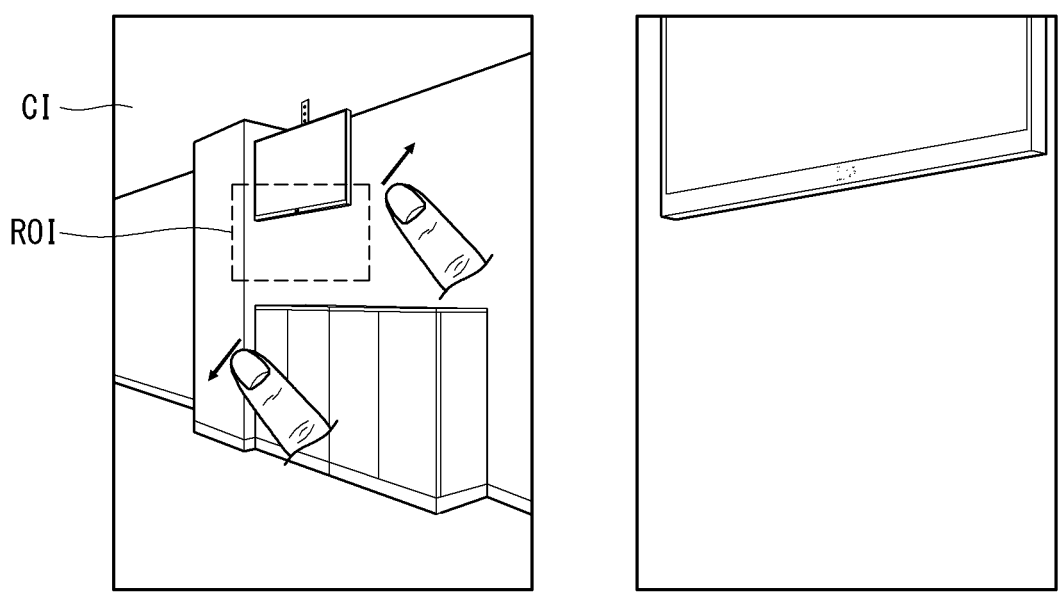
FIGS. 3A and 3B are diagrams for describing a zooming operation applied to an embodiment of the present invention.
Figure 3B:
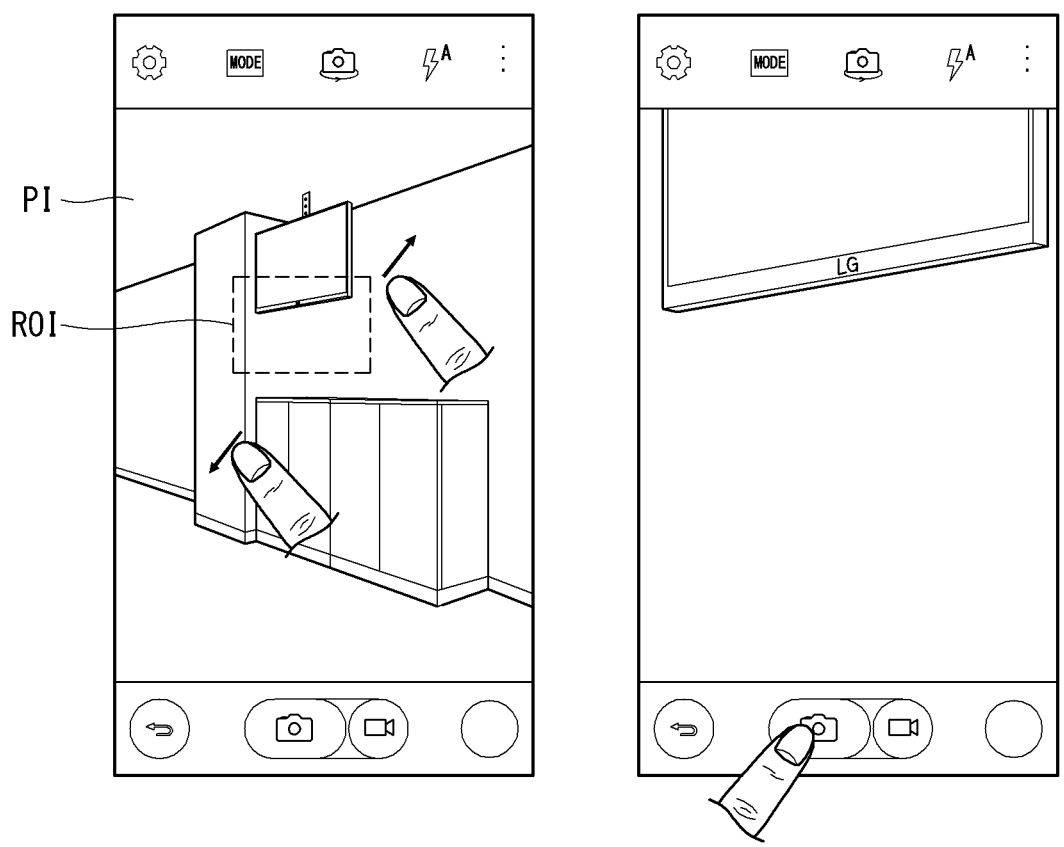

FIGS. 3A and 3B are diagrams for describing a zooming operation applied to an embodiment of the present invention.

FIGS. 3A and 3B illustrate a case in which an image stabilization function is not applied to a region of interest ROI and a case in which the image stabilization function is applied to the region of interest ROI.

Referring to FIG. 3A, when a gesture of zooming in on a region of interest ROI in an image CI captured by executing a camera is applied, the controller 180 magnifies the ROI to the entire area of the touchscreen 151 and displays the ROI therein. In this case, image stabilization is not applied to the ROI and thus definition decreases and the image may be displayed with low definition.

General digital photographing devices (including mobile terminals) have an image stabilization function. The image stabilization function includes an optical image stabilization (OIS) technique and a digital image stabilization (DIS) technique. One of the two techniques can be applied to image capturing.

The OIS technique is a hardware technique which extracts a hand tremor prediction vector using a gyro sensor or the like and moves an optical system in response to the extracted hand tremor prediction vector. This technique has excellent image stabilization performance but requires a device and a driving device for rapid and accurate signal processing and thus may increase manufacturing costs for the image stabilization function.

The DIS technique is a software technique by which the controller 180 of the mobile terminal 100 analyzes and corrects an input image signal. Accordingly, the DIS technique can reduce manufacturing costs for the image stabilization function.

In embodiments of the present invention, it is assumed that the DIS technique is applied to a process of zooming in/out an ROI to acquire a zoomed in/out image for convenience of description. Particularly, the DIS technique may be applied in consideration of manufacturing costs and a narrow space inside a mobile terminal due to various components included therein.

A procedure for capturing an image and processing the captured image applied to embodiments of the present invention is implemented on the basis of the DIS technique. However, the present invention is not limited thereto and any one of the OIS and DIS techniques can be applied to the present invention.

In FIG. 3A, when the image is captured and then the ROI is zoomed in as described above, DIS processing is not performed on the image and thus the magnified image may be displayed with low definition. Referring to FIG. 3B, when a gesture of zooming in on the ROI is input in a state in which the controller 180 executes the camera application and a preview image PI input through the camera is displayed on the touchscreen 151, the aforementioned image stabilization function (DIS) is applied and thus an image of the magnified ROI with high definition can be acquired.

That is, when a user intends to magnify a predetermined ROI and then capture an image including the ROI, as shown in FIG. 3B, a gesture of magnifying the ROI is applied and then the image is captured, in general. However, according to an embodiment of the present invention, it is possible to acquire an image having a zoomed in ROI through a single capture command without user manipulation (gesture input, drag input and the like) for magnifying the ROI.

Figure 4:
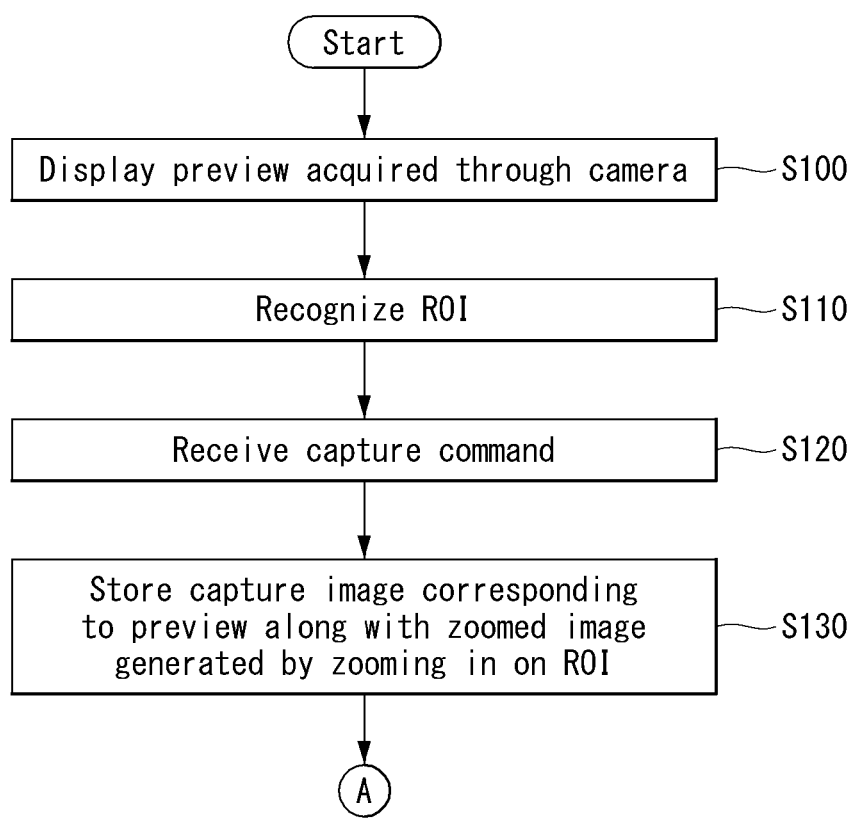
FIG. 4 is a flowchart illustrating a method of controlling a mobile terminal according to a first embodiment of the present invention.
Figure 5:
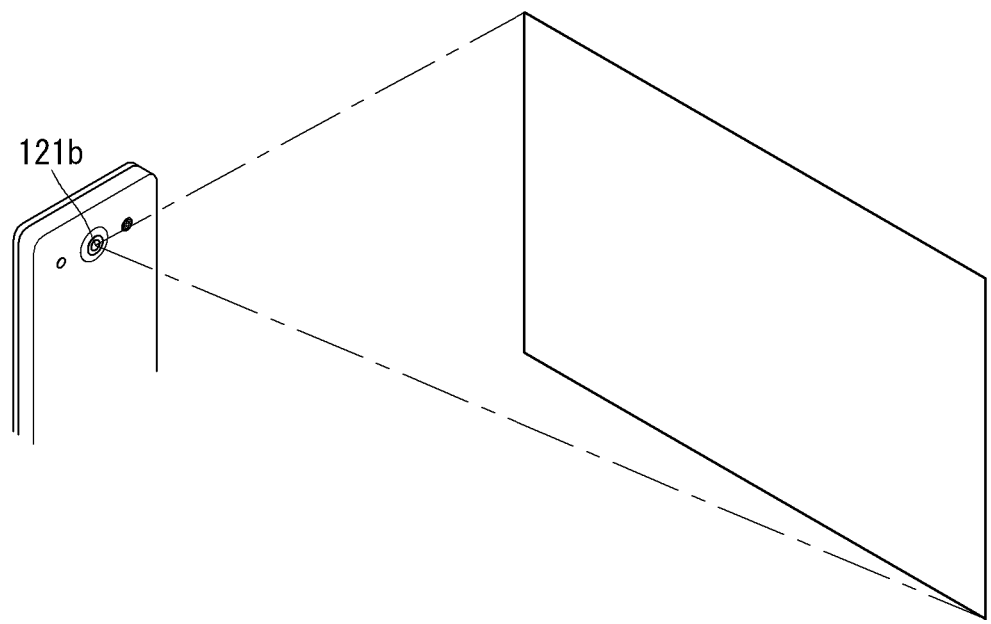
FIGS. 5 to 6B are diagrams for describing the concept of capturing a region of interest according to the first embodiment of the present invention.
Figure 5:
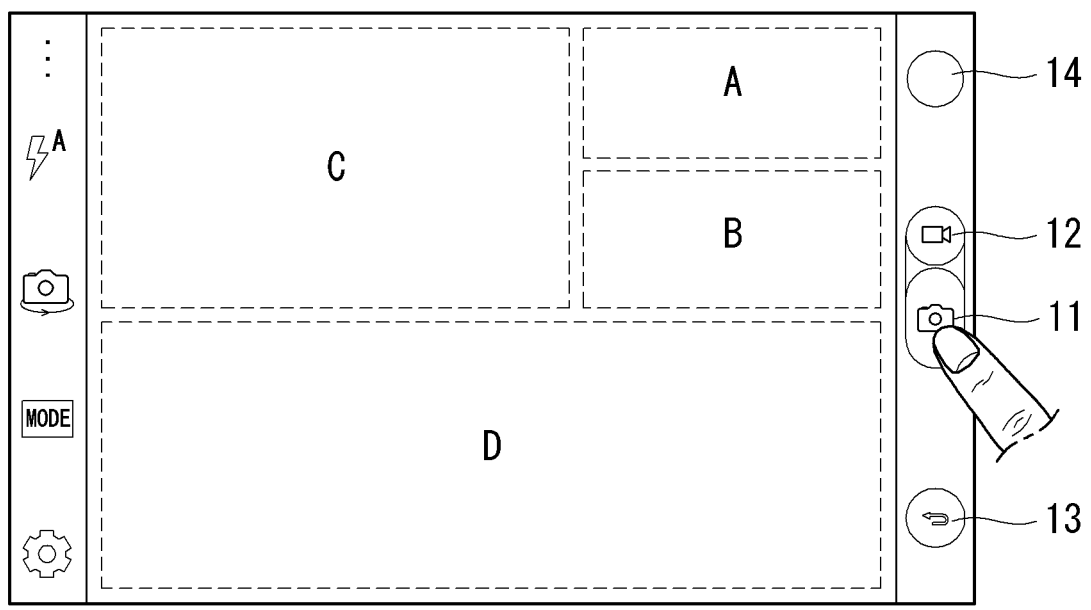
Figure 6A:
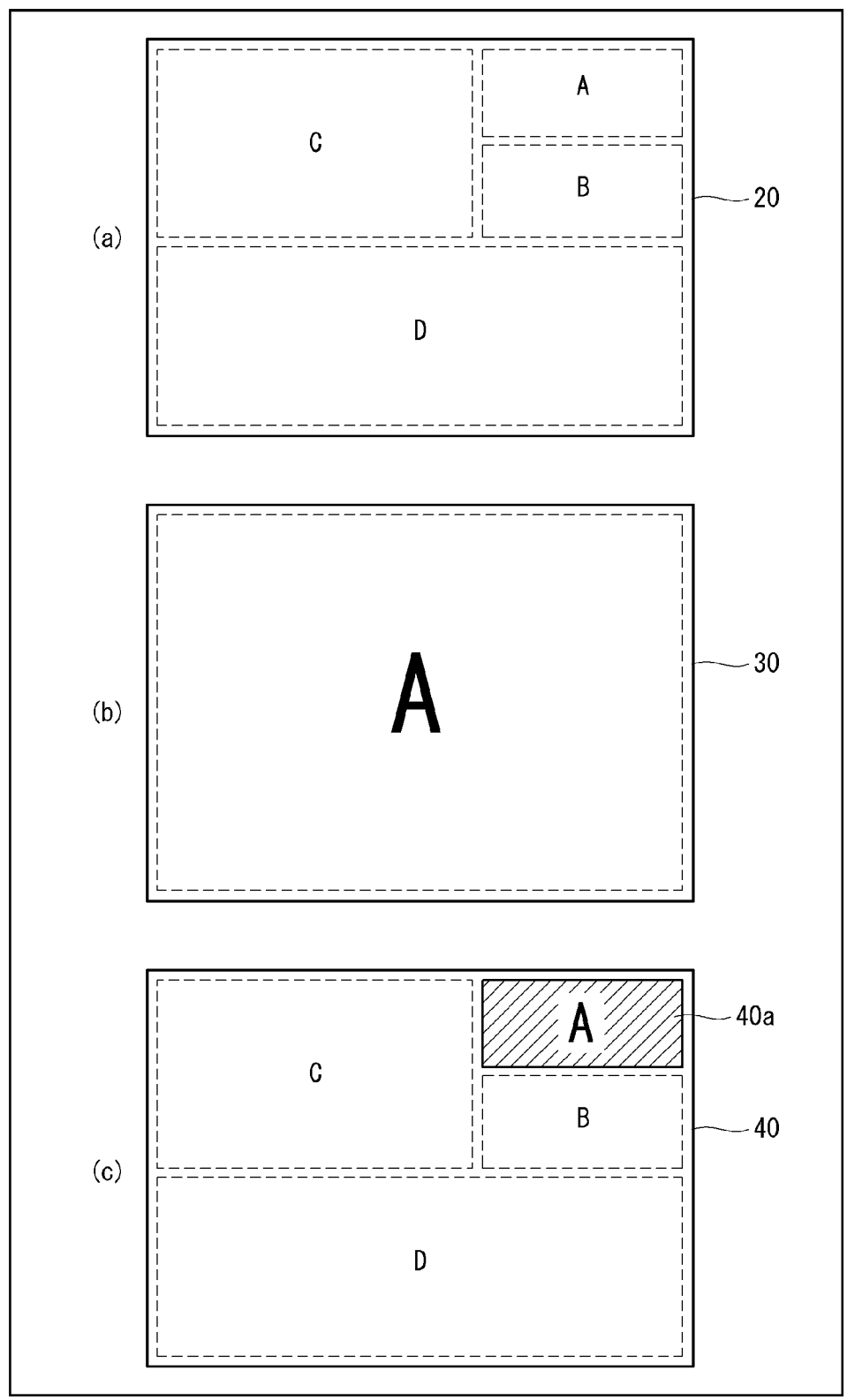
Figure 6B:
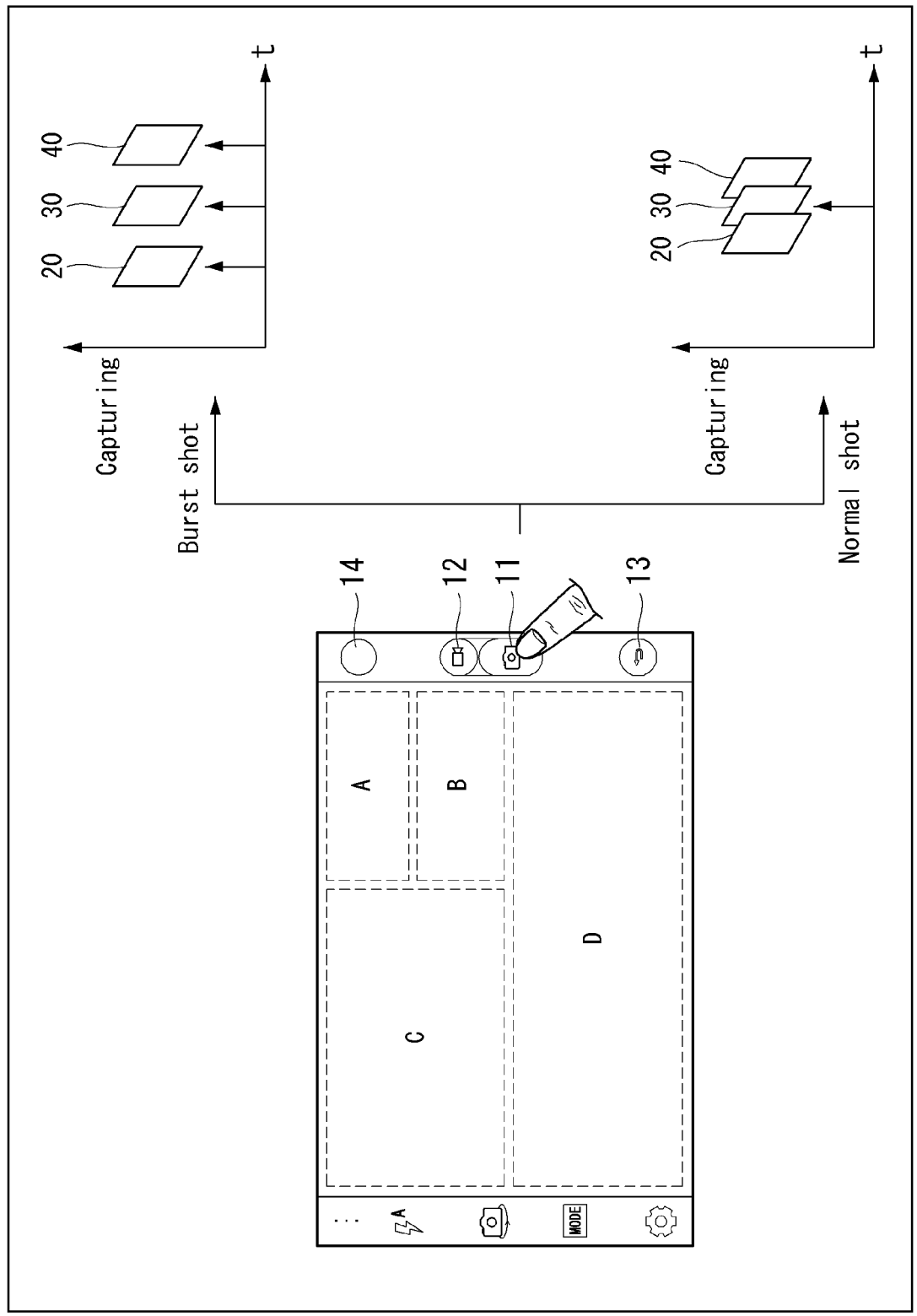

FIG. 4 is a flowchart illustrating a method of controlling a mobile terminal according to a first embodiment of the present invention and FIGS. 5 to 6B are diagrams for describing the concept of capturing a region of interest according to the first embodiment of the present invention;

The method of controlling a mobile terminal according to the first embodiment of the present invention may be implemented in the mobile terminal described above with reference to FIGS. 1A to 2. The method of controlling a mobile terminal according to the first embodiment of the present invention and operation of the mobile terminal 100 to implement the method will be described in detail.

Referring to FIG. 4, the controller 180 displays a preview acquired through a camera on the touchscreen 151 (S100).

The camera may include the cameras 121*b* and 121*c* provided to the rear side of the mobile terminal 100. The preview may be a front view image acquired through the rear cameras.

The controller 180 may recognize an ROI in the preview (S110).

The controller 180 may automatically recognize the ROI.

The controller 180 may execute the camera application and, simultaneously, automatically recognize the ROI in the preview. The controller 180 may execute a specific application (program) for ROI recognition which is executed in association with the camera application in order to recognize the ROI.

According to an embodiment, the ROI may be a region which cannot be clearly recognized by a user due to a distance between the camera and the corresponding object, or the like. For example, a region including a large amount of text in a preview or an object corresponding to a person a predetermined distance or longer from the camera, and thus appearing small, may become the ROI.

In addition, the ROI may be a dynamic object moving on the preview when the object is captured through the camera or a predetermined region including the dynamic object.

The ROI may be designated through predetermined input. For example, the ROI may be a region including at least one object selected through touch input from at least one object included in the preview. In a conventional method, a specific region is zoomed in through a pinch zoom input and the region zoomed in on a preview is captured. In this case, an image of the specific region magnified according to zooming can be acquired, but the entire image can be acquired through additional capture operation. However, according to an embodiment of the present invention, it is possible to designate an ROI through touch input applied to a specific object or a region including the specific object in a preview image to additionally acquire the zoomed in ROI in addition to the entire preview image.

Here, the additionally acquired zoomed in image may be defined as an image acquired by zooming in on the ROI in a software manner when the entire image is acquired through a capture command. That is, the zoomed in image can be acquired as background in a process of capturing the entire image.

The ROI may include a plurality of regions in the preview image. For example, when the preview image includes two regions having character recognition rates lower than a predetermined value, the controller 180 may set the two regions as ROIs and acquire zoomed in images of the ROIs.

The ROI may include text in the preview image. The controller 180 may recognize a region including the text as an ROI when the recognition rate of the text is lower than a predetermined value.

Characters in the preview image may be recognized using an OCR program which realizes the principle of an optical character reader (OCR), that is, the principle of radiating light to printed matter or images and detecting a difference between quantities of reflected light to recognize and read characters, in a software manner. Conventional OCR techniques have difficulty in analyzing or processing images, which are captured in environments such as ambient lighting and shade which may be generated in a mobile environment, to recognize characters, and thus binarization processing performance may deteriorate when an OCR engine recognizes characters. Accordingly, in an embodiment of the present invention, character recognition can be performed using a filter for brightness control or saturation control. For example, the controller 180 may acquire a brightness value of pixels corresponding to characters on the touchscreen 151, and when the acquired brightness value is less than a predetermined brightness value, increase the brightness value of the pixels to improve character recognition accuracy.

While the method of setting an ROI or recognizing the ROI on the mobile terminal 100 has been described, the present invention is not limited thereto. That is, the process of setting or recognizing the ROI may be modified and implemented in various manners.

The controller 180 may receive a capture command in a state in which the ROI in the preview image has been recognized (S120).

The capture command may be received through input applied to a capture button included in an image-capture control region displayed along with the preview image displayed on the touchscreen 151. The capture command may be received through gesture recognition, voice recognition and the like in addition to touch input.

The controller 180 may generate a capture image corresponding to the preview image in response to the capture command and store the capture image along with a zoomed in image generated by zooming in on the ROI in the memory 170 (S130).

The capture image may refer to an image acquired by capturing the preview image and the zoomed in image may refer to an image acquired by zooming in on the ROI.

Here, the zoomed in image may refer to an image obtained by magnifying the ROI by a predetermined magnification. The magnification may be a magnification for magnifying an image to the size of the entire area of the touchscreen 151 or a predetermined magnification (maximum magnification available in a software manner). Here, the magnification may be optically changed on the basis of a distance between the camera and the ROI (subject of interest), the size of the ROI, the type of an object included in the ROI, and the like. Embodiments to which various magnifications are applied will be described below. Accordingly, the controller 180 may store at least one image through one capture command. A process of capturing an image through the first embodiment of the present invention and an example of storing the captured image will be described below with reference to FIGS. 5 to 6B.

Referring to FIG. 5, a front view may be acquired through the camera 121b provided to the rear side of the body of the mobile terminal 100. The controller 180 may acquire the front view and display a preview on the touchscreen 151.

The preview may include at least one object. The at least one object may include a person, a background, an object and text. In addition, the controller 180 may recognize at least one region A among regions A, B, C and D included in the preview as an ROI.

As described above, the controller 180 may automatically recognize the ROI on the preview or recognize the ROI through predetermined input.

The controller 180 captures an image corresponding to the preview displayed on the touchscreen 151 upon reception of a capture command.

The controller 180 captures the image provided as the preview in response to the capture command. In this process, the controller 180 additionally generates an image related to the recognized ROI.

Referring to FIG. 6A, upon reception of a capture command in a state in which an ROI A has been set, the controller 180 may (a) capture a first image 20 corresponding to the entire area of the preview and store the first image 20 in the memory or store at least one of (b) a second image 30 captured in a state in which the ROI A has been magnified to the size of the touchscreen 151 and (c) a third image 40 acquired by replacing the image corresponding to the ROI in the first image with the second image and mapping the second image to the ROI (40a) in the memory.

The first image 20 is an image usually captured according to the capture command. The second image 30 is acquired by zooming in on the ROI to the size of the first image 20 while the image 20 is captured and is generated by magnifying the ROI A without user manipulation for magnifying the ROI on the preview. The third image 30 may be acquired by reconstructing the first image 20 and the second image 30 into one image. For example, the third image 40 can be generated by reducing the second image to the size of the ROI A and mapping the reduced image to the position of the ROI A of the first image. In the specification, the third image 40 may be called a perfect image for convenience of description.

An example of acquiring the perfect image according to an embodiment of the present invention will be described with reference to FIG. 6B.

Upon reception of a capture command in a state in which the preview image has been provided, the controller 180 may continuously capture the first image 20, the second image 30 and the third image 40 at predetermined intervals in a burst shot mode. The controller 180 may capture the first image 20 at a first time t1, capture the second image 30, which is acquired by zooming in on the recognized ROI, at a second time t2, and capture the third image 40, which is acquired by reducing the zoomed in image of the recognized ROI to the size of the ROI and replacing the image corresponding to the ROI of the first image 20 with the reduced image, at a third time t3.

The controller 180 may perform a capture operation at the first time t1 only once in a normal shot mode, process the captured image in a software manner to generate the second image 30 and the third image 40 and store the generated images in the memory.

When a plurality of ROIs is recognized, the controller 180 may intuitively notify a user that zoomed in images of the recognized ROIs are generated by outputting as many alarms as the number of continuous captures in the burst shot mode.

The first image 20, the second image 30 and the third image 40 may be displayed in various forms in a gallery view provided to the user through a gallery application.

FIGS. 7A to 9 are diagrams for describing an example of recognizing an ROI according to the first embodiment of the present invention.

Figure 7A:
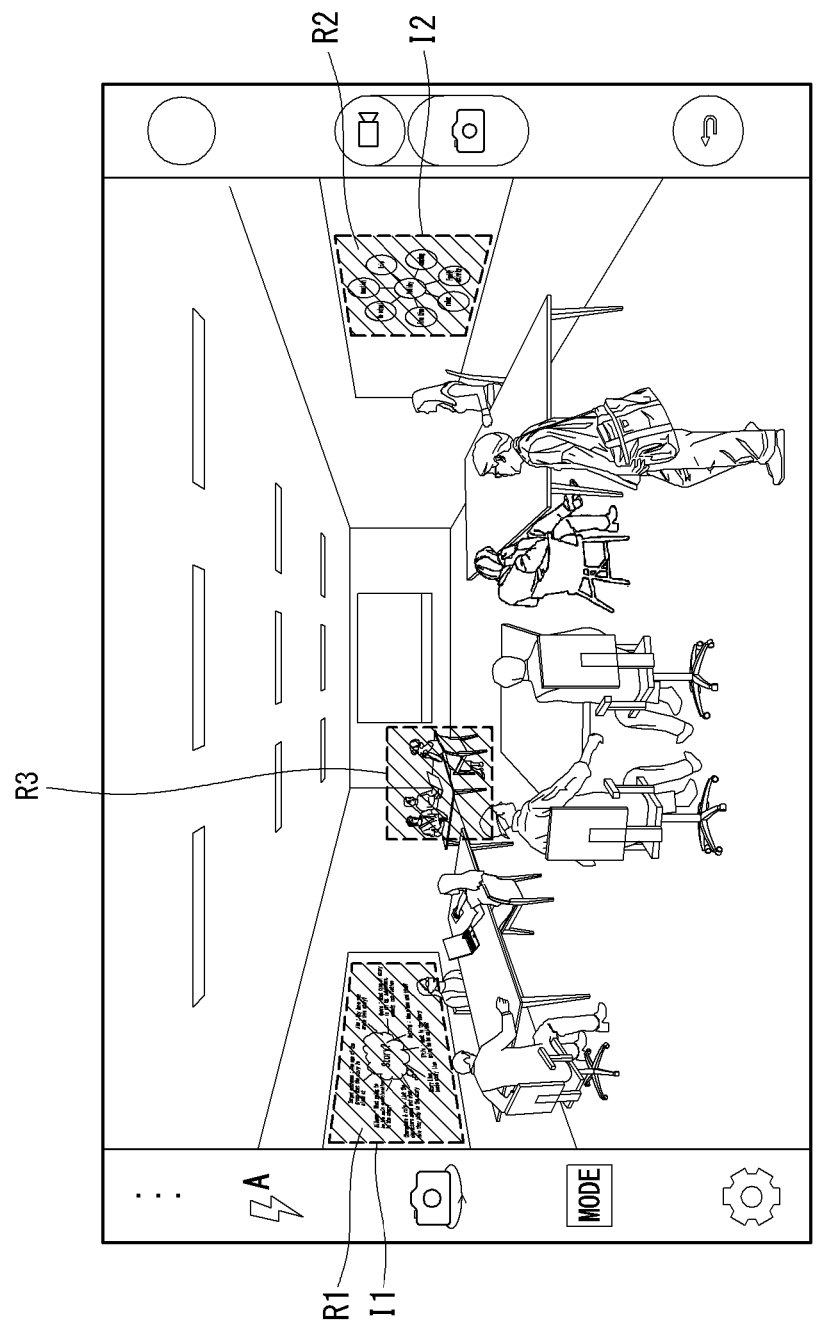
FIGS. 7A to 9 are diagrams for describing an example of recognizing a region of interest according to the first embodiment of the present invention.

Referring to FIG. 7A, the controller 180 may execute the camera to display a preview image on the touchscreen 151. The controller 180 may recognize at least one ROI R1, R2 and R3 in the preview image. The controller 180 may automatically recognize the ROI, and the method of recognizing the ROI has been described above.

The controller 180 may execute an OCR program to recognize a text during display of the preview image and designate an ROI depending on a text recognition rate. For example, a region in which the text is displayed is far from the mobile terminal 100 in a preview state and thus the text may not be clearly visible. That is, when the text viewed on the preview in a state in which zooming operation has not been performed on the text region is not clear and thus the user cannot correctly recognize the text, the controller 180 may set the text region as an ROI.

The controller 180 may recognize the first ROI R1 and the second ROI R2 and display indicators I1 and I2 on the preview image to indicate recognition of the ROIs. The indicators I1 and I2 may be displayed at the borders of the ROIs. The method of displaying the indicators is not limited to the aforementioned example and may be modified in various manners.

Here, relative distances between the first ROI R1 and the second ROI R2 and the mobile terminal 100 are identical or a difference between the relative distances is so insignificant that they can be considered identical.

Although the distances between the first ROI R1 and the second ROI R2 and the mobile terminal 100 are substantially identical, the first and second ROIs may have different objects and text sizes.

The distance between the third ROI R3 and the mobile terminal 100 may be longer than the distance between the first ROI R1 and the second ROI R2 and the mobile terminal 100.

As described above, in an embodiment of the present invention, a plurality of different ROIs on a preview can be recognized and optimal magnifications can be applied to a process of zooming in on the ROIs. That is, the controller 180 can apply different magnifications to the ROIs depending on the distances between the ROIs and the mobile terminal 100. In addition, the controller 180 may apply different magnifications to the ROIs depending on information such as the quantities and sizes of text and objects included in the ROIs even if the distances between the ROIs and the mobile terminal 100 are identical in the zooming process.

A description will be given of specific examples of applying different magnifications in a process of generating a perfect shot according to an embodiment of the present invention.

Figure 7B:
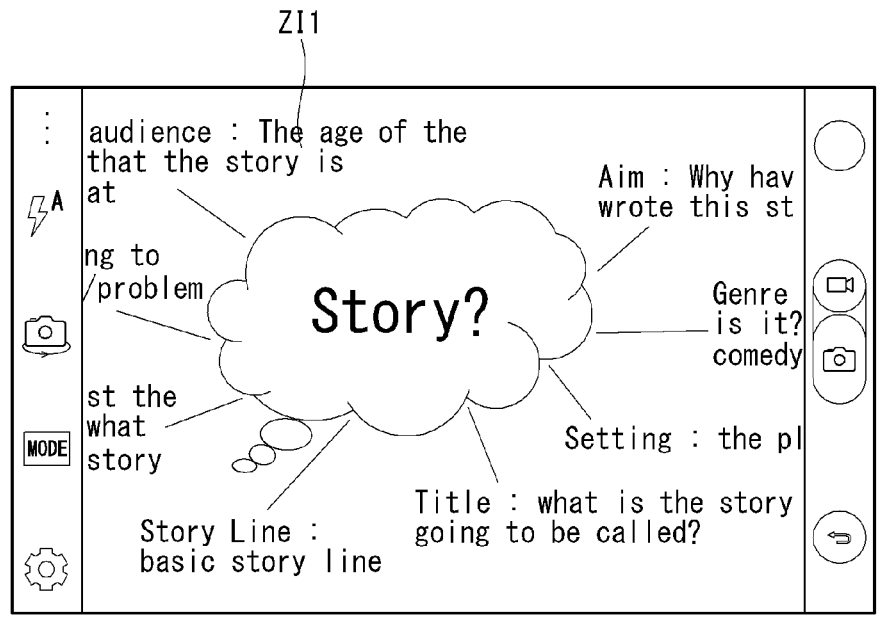
Figure 7B:
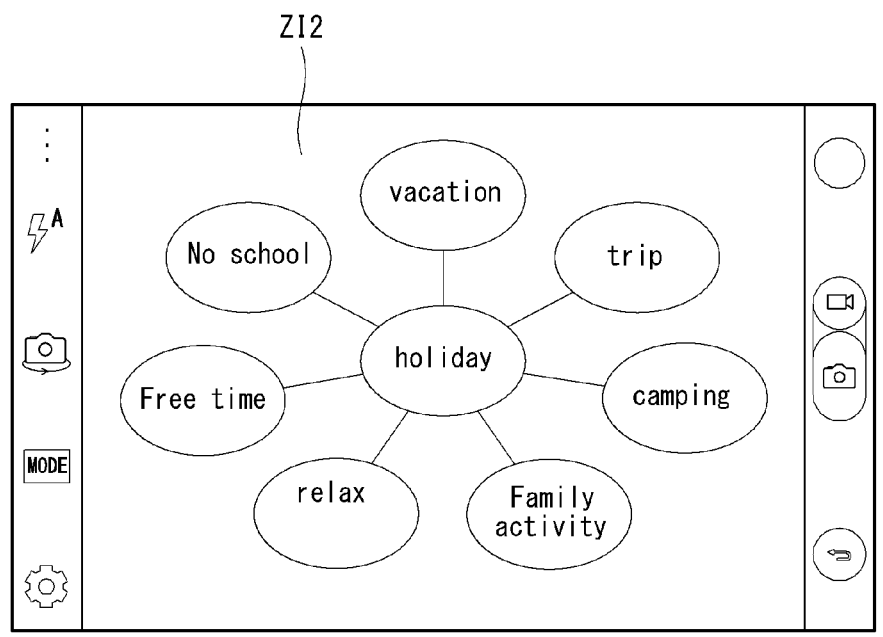

Referring to FIG. 7B, a first zoomed image ZI1 is an image acquired by zooming in on the first ROI R1 and a second zoomed image ZI2 is an image acquired by zooming in on the second ROI R2. As described above, the distances between the first ROI R1 and the second ROI R2 and the mobile terminal 100 are identical, but the quantity of text included in the first ROI R1 may be greater than that of the second ROI R2. Otherwise, the first ROI R1 may be larger than the second ROI R2. In this case, when the same zoom magnification ×M is applied, the second zoomed image ZI2 is magnified to the size of the touchscreen 151 and displayed thereon, but the first zoomed image ZI1 may be displayed with at least part of the edge thereof cut-off.

Figure 7C:
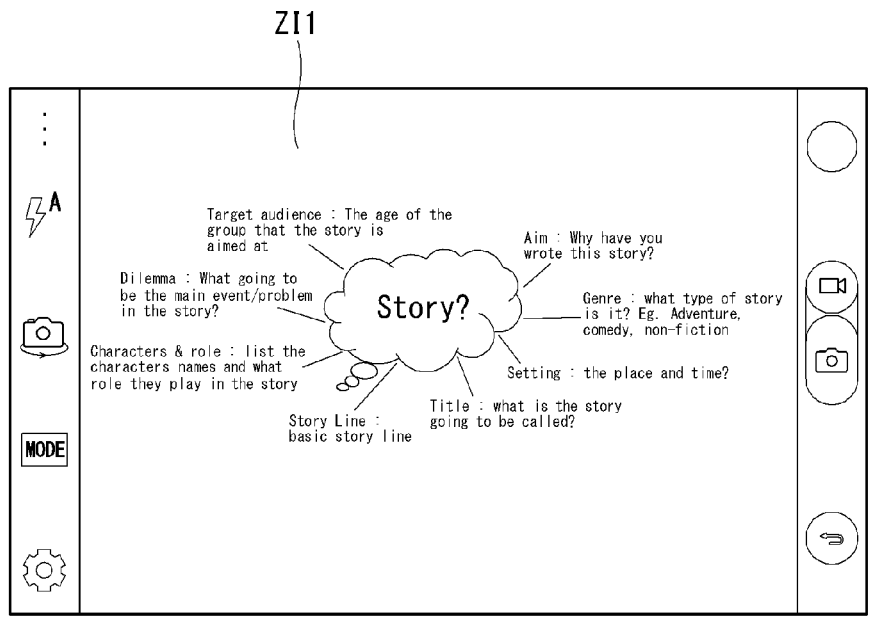
Figure 7C:
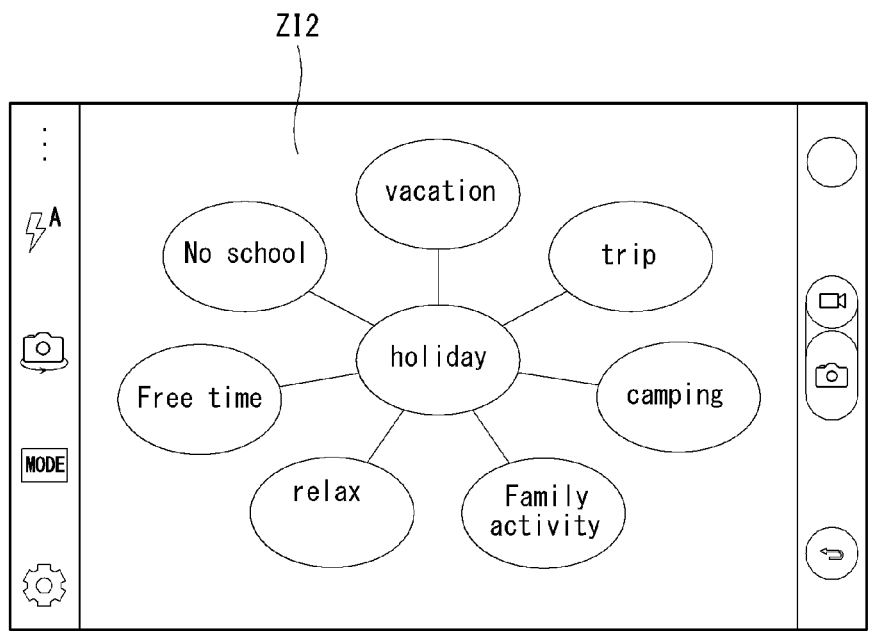

Accordingly, the controller 180 applies a magnification ×L, which is different from the magnification ×M applied to the second zoomed image ZI2, to the first zoomed image ZI1 such that the zoomed image of the first zoomed image ZI1 corresponds to the size of the touchscreen 151, as shown in FIG. 7C. Here, the magnification XL applied to the first zoomed image ZI1 may be lower than the magnification ×M applied to the second zoomed image ZI2.

Figure 7D:
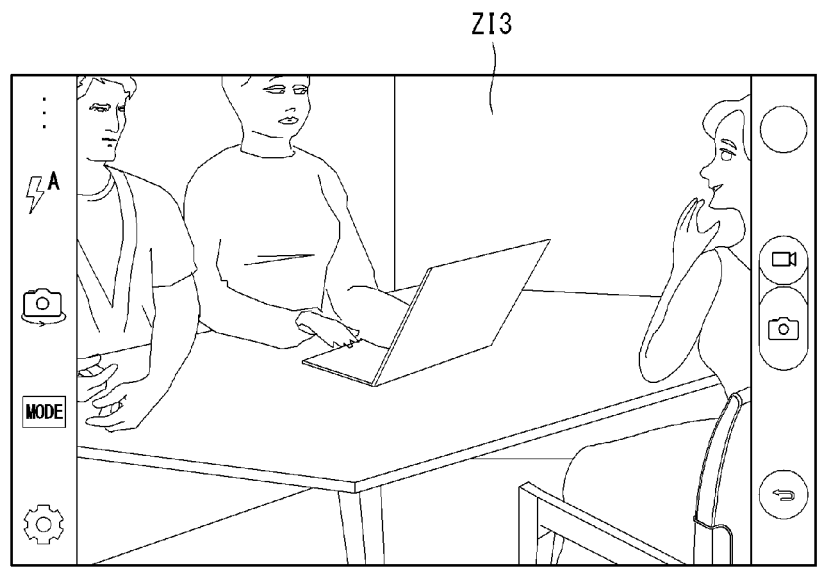
Figure 7D:
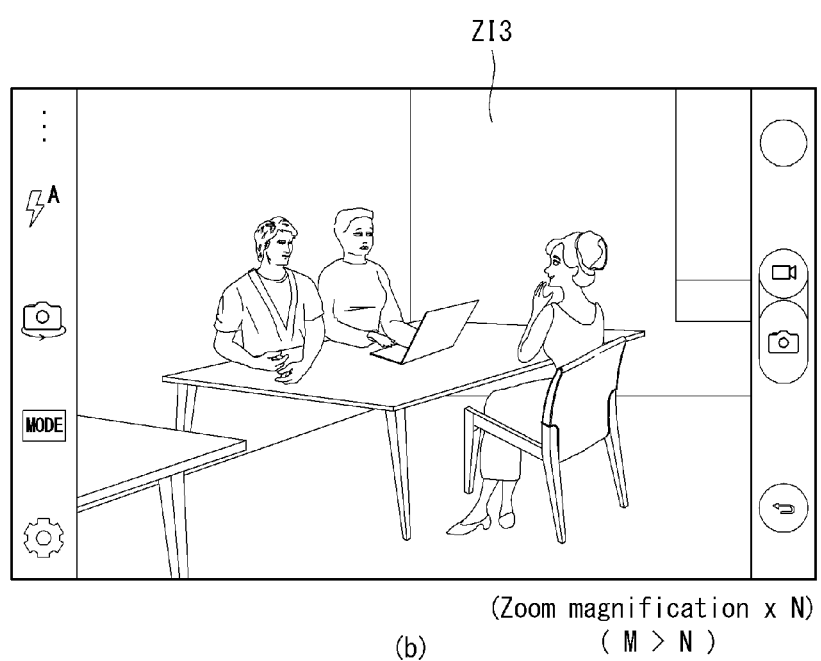

The controller 180 may apply a magnification depending on a distance between a recognized ROI and the mobile terminal 100. Referring to FIG. 7D, for example, the distance between the third ROI R3 and the mobile terminal 100 may be longer than the distances between the first and second ROIs and the mobile terminal 100. In this case, when the magnification ×M applied to the first and second ROIs (refer to FIG. 7B) is applied to the third ROI R3, the third ROI R3 may be displayed while at least part of objects included therein is cut-off, as in FIG. 7C. Accordingly, the controller 180 may apply a magnification ×N lower than the magnification ×M to the third ROI such that the third zoomed image ZI3 are zoomed in/out to correspond to the size of the touchscreen 151 and displayed thereon.

An ROI may be designated by a user manipulation in a preview state. In the above-described example, the controller 180 automatically designates text as an ROI. However, when there is a region which cannot be easily recognized by the user other than text on the preview image, an ROI may be set by the user.

Figure 8A:
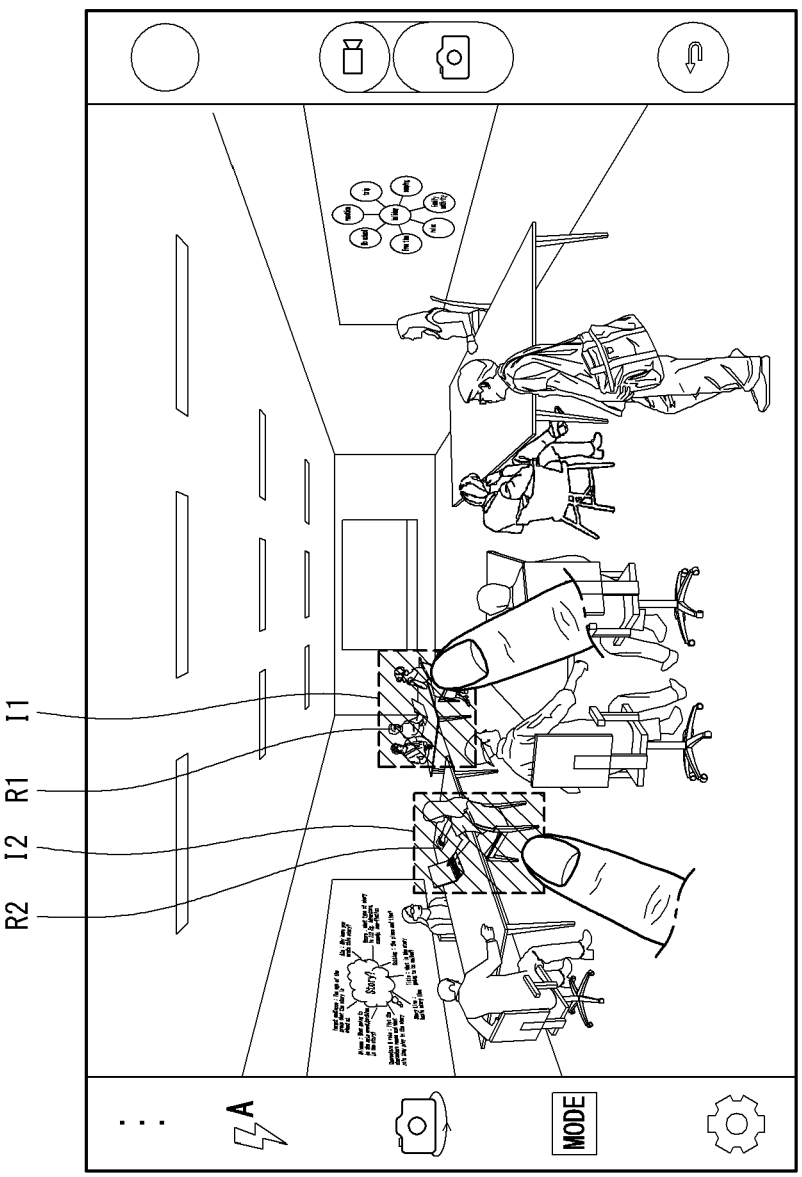

Referring to FIG. 8A, the controller 180 may display a preview image acquired through the camera on the touchscreen 151. The preview image may include one or more objects which are persons and the objects may need to be zoomed in due to relative distances between the objects and the camera.

The controller 180 may receive predetermined touch input (e.g., long touch input) with respect to a first ROI R1 including a person and a second ROI R2 including a person. The controller 180 may set regions to which the predetermined touch input is applied as ROIs R1 and R2. Here, the controller 180 may designate a region including people located near a touch point as an ROI in addition to a region including a person corresponding to the touch point.

When the ROIs are designated on the preview image as described above, the controller 180 may display indicators I1 and I2 for indicating designation of the ROIs on the preview image. The indicators I1 and I2 may disappear after being displayed on the preview image for a predetermined time after designation of the ROIs.

Figure 8B:
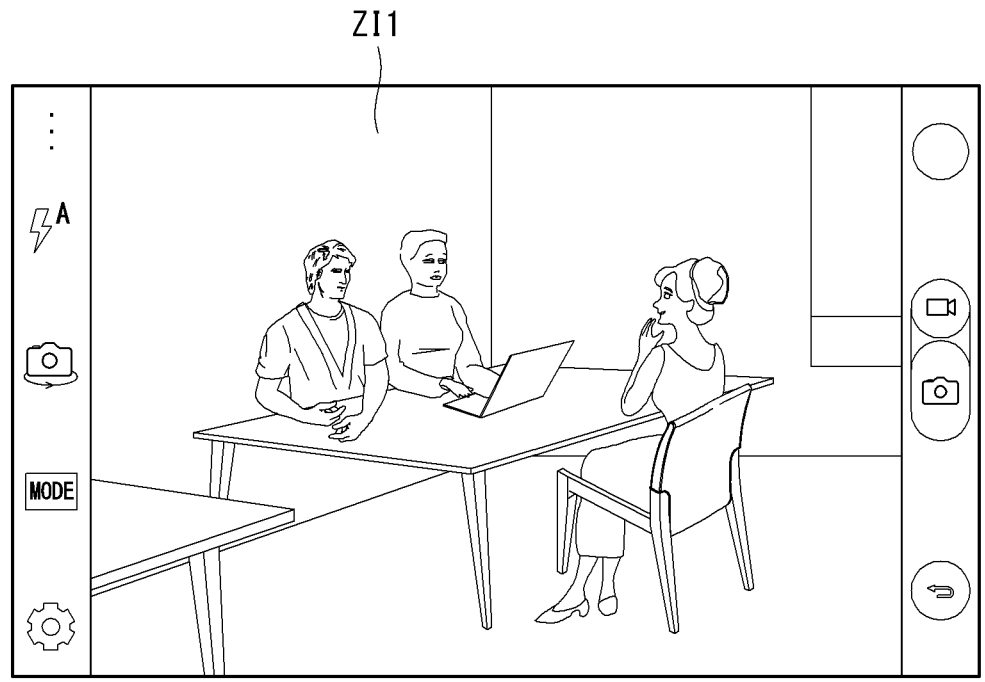
Figure 8B:
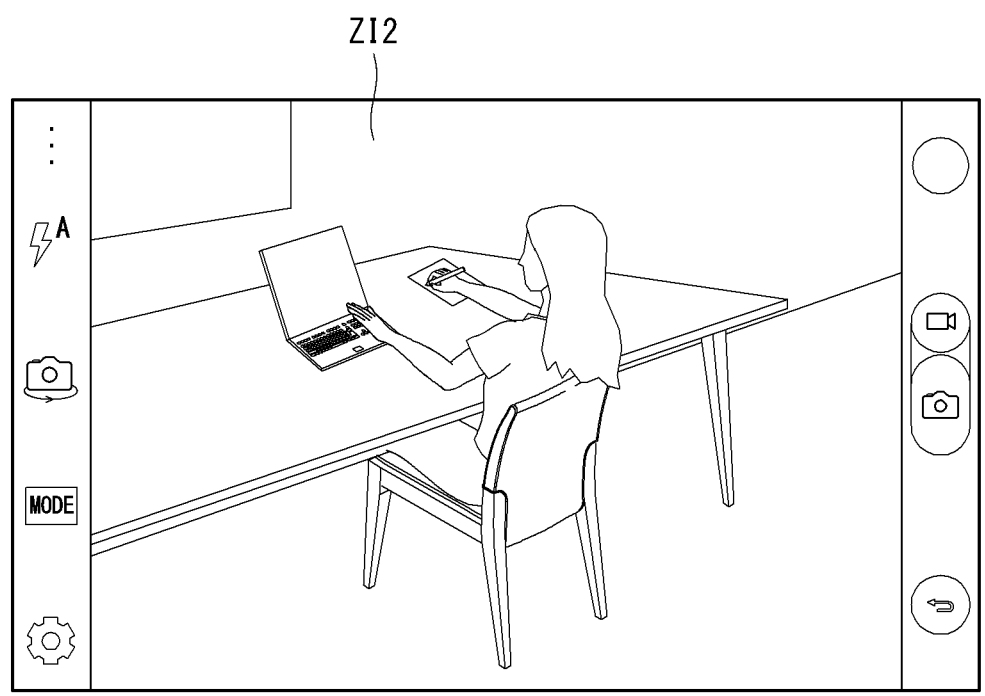
Figure 9:
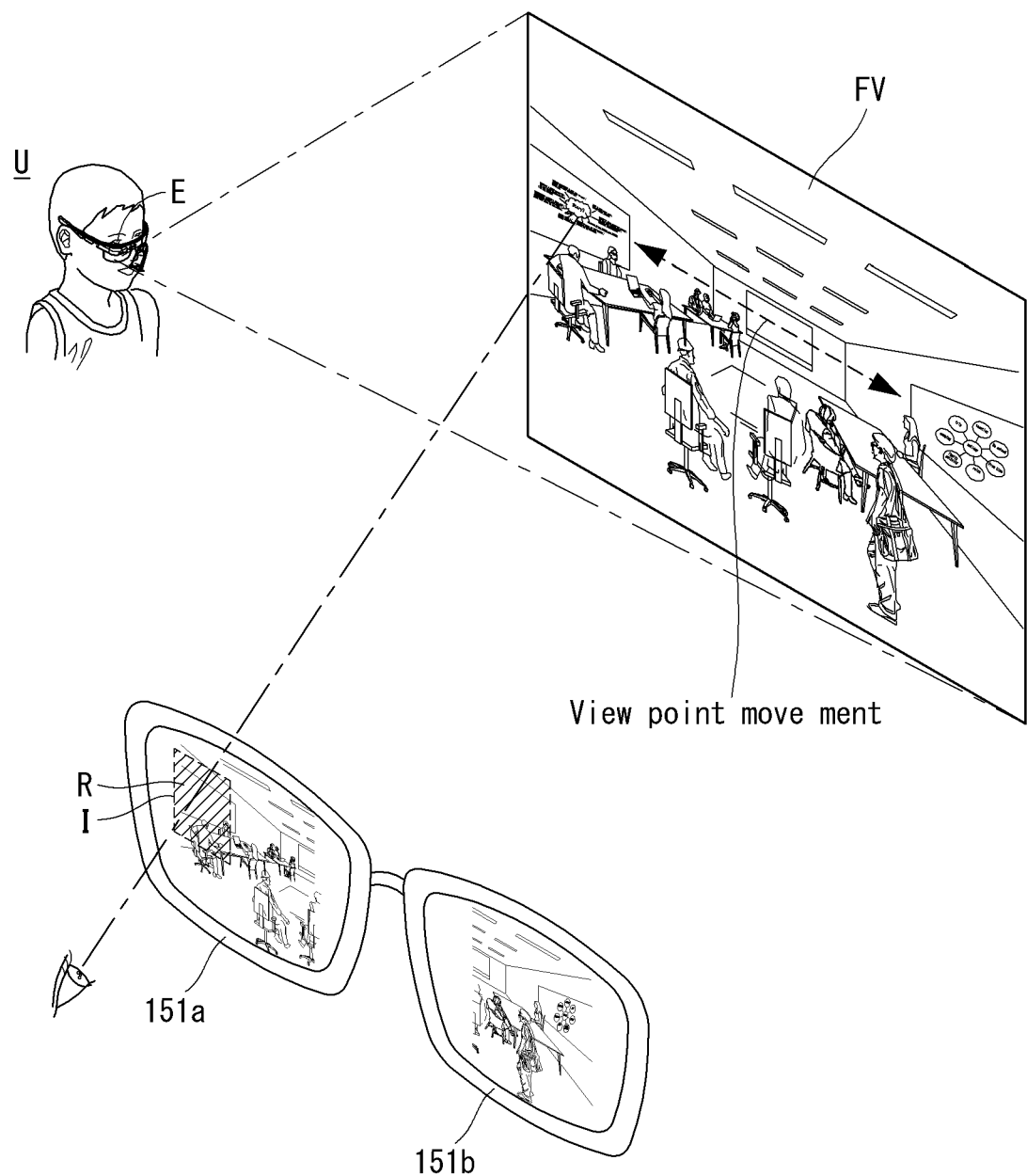

Referring to FIG. 8B, upon reception of a capture command after designation of the ROIs R1 and R2, the controller 180 may generate a first zoomed image ZI1 corresponding to the first ROI R1 and a second zoomed image ZI2 corresponding to the second ROI R2 and store the first and second zoomed images ZI1 and ZI2 in the memory.

According to an embodiment of the present invention, the controller 180 may automatically recognize a predetermined ROI, set the ROI through predetermined touch input, or recognize the ROI through a combination of automatic recognition and recognition through touch input.

Furthermore, the controller 180 may analyze an image capture pattern of the user of the mobile terminal 100 and recommend an ROI in consideration of images, locations and the like frequently captured by the user.

The controller 180 may perform auto-focusing on the ROIs R1 and R2 to zoom in/out the ROIs R1 and R2.

Therefore, according to the first embodiment of the present invention, it is possible to acquire an image in which a region that cannot be easily recognized on a preview image by a user has been zoomed in/out through a single capture command by receiving user input for selecting a specific person or a specific object in the preview image.

FIGS. 7A to 7D illustrate operation of automatically recognizing an ROI in a preview image and FIGS. 8A and 8B illustrate operation of manually setting an ROI in a preview image through user manipulation and then capturing an image.

Meanwhile, the mobile terminal 100 may be an eyeglasses-type mobile terminal (400 of FIG. 2) as show in FIG. 2. The operation of the mobile terminal 100 according to the first embodiment of the present invention may be applied to the eyeglasses-type mobile terminal including cameras.

A user U wearing the eyeglasses-type mobile terminal may view a front view FV through the eyeglasses using a camera E. The controller 180 may track the view point of the user. Since the camera is located in proximity to the eyes, the camera can acquire the view FV viewed by the user as an image. That is, the controller 180 may execute the camera and track view point movement of the user while a preview image is provided to the left and right glasses.

When the controller 180 detects that the view point of the user stops at a specific point for a predetermined time, the controller 180 may designate the specific point as an ROI.

Alternatively, when the controller 180 recognizes a user's gesture of blinking the eyes at a specific point at which the user gazes, the controller 180 may designate the specific point as an ROI. The eyeglasses-type mobile terminal can more easily recognize an ROI using a view point direction of the user or a time for which the view point remains.

Alternatively, the eyeglasses-type mobile terminal may include the user input unit 243b, as shown in FIG. 2. The controller 180 may recognize a direction in which the user gazes on the front view FV, and when input applied to the user input unit 423b is additionally received, designate a region corresponding to the direction as an ROI. That is, the controller 180 may recognize a combination of a view point direction of the user and tactile input applied through the user input unit as a trigger signal for setting an ROI.

When the ROI is recognized while the front view FW is displayed on a left display 151*a* and a right display 151*b*, the controller 180 may display an indicator I on the display 151*a*.

Processes of capturing an image and storing the captured image after designation of the ROI have been described.

Figure 10A:
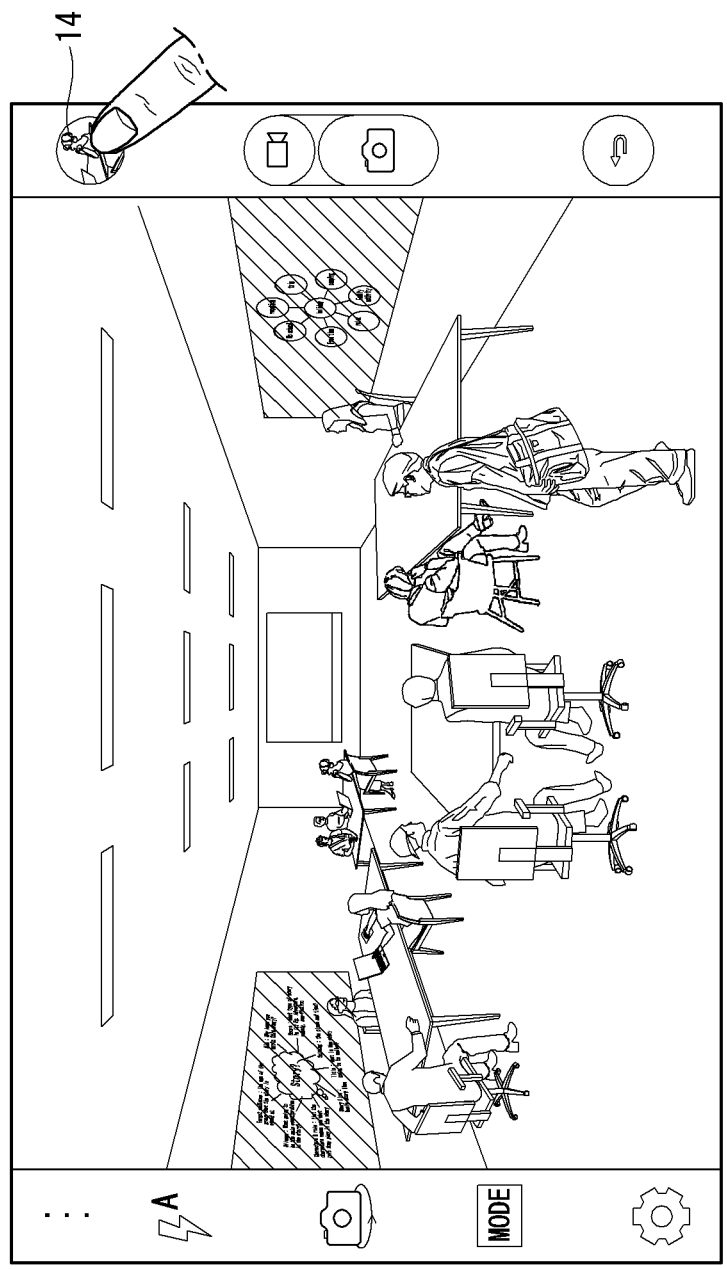
FIGS. 10A and 10B are diagrams for describing operation of storing a captured image according to the first embodiment of the present invention.
Figure 10B:
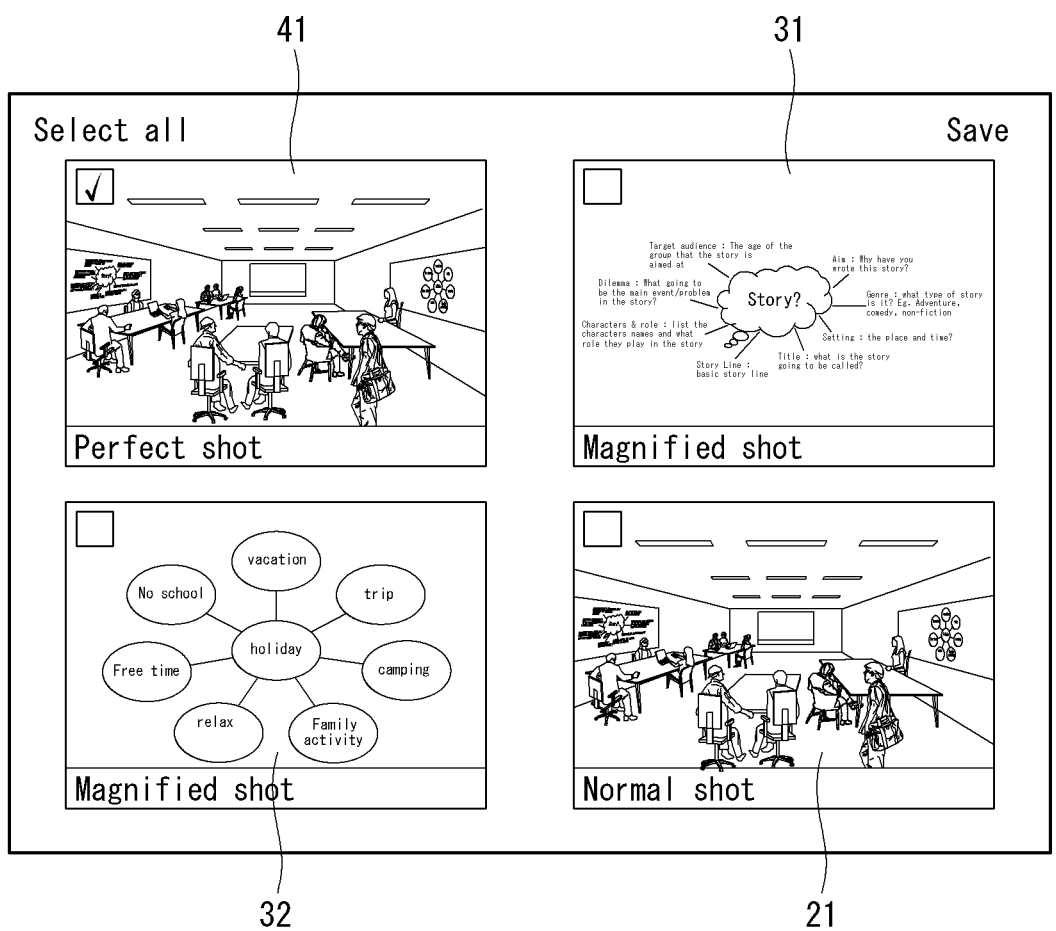

FIGS. 10A and 10B are diagrams for describing operation of storing a captured image according to the first embodiment of the present invention.

Referring to FIG. 10A, when input for selecting a view button 14 is received after an image is captured according to the first embodiment of the present invention, previously generated images 21, 31, 32 and 41 may be displayed on the touchscreen 151, as shown in FIG. 10B.

The previously generated images may include a normal image 21 acquired by capturing a preview image, zoomed images 31 and 32 acquired by magnifying ROIs to the size of the normal image 21 and capturing the ROI, and an image 41 acquired by inserting the zoomed images of the ROIs into corresponding positions of the normal image. As described above, the image acquired by inserting the zoomed images of the recognized ROIs into corresponding positions of the normal image is called a perfect shot.

The controller 180 may store at least one image selected from the three types of images in the memory.

Figure 11A:
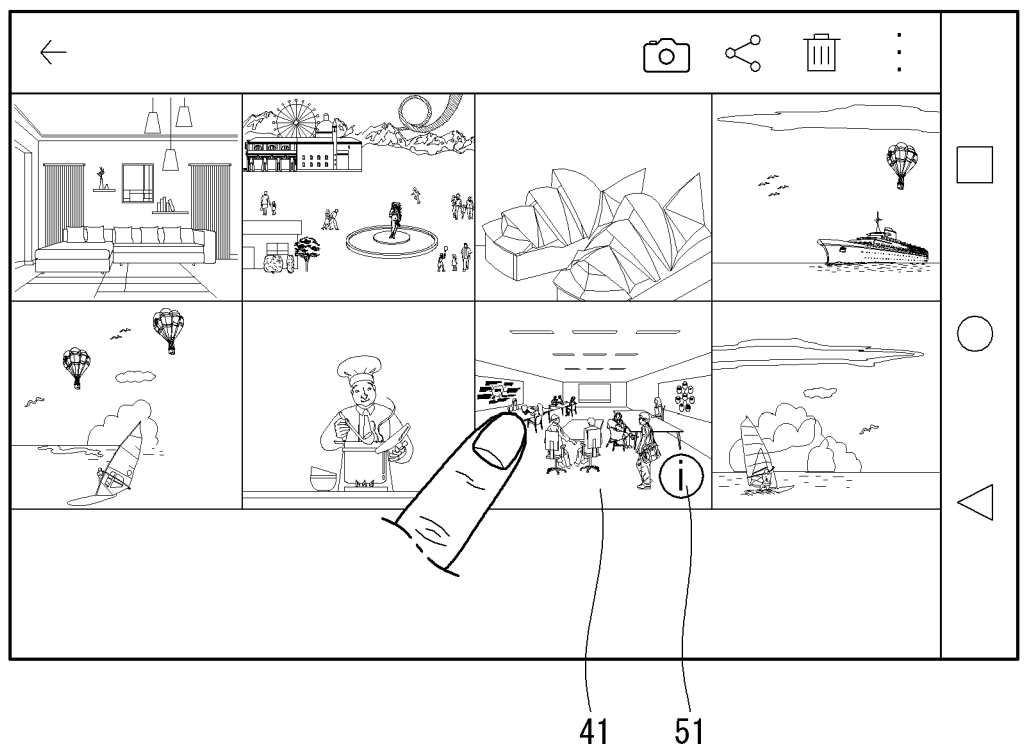
FIGS. 11A and 11B are diagrams for describing an example of displaying a captured image through a gallery application according to the first embodiment of the present invention.
Figure 11B:
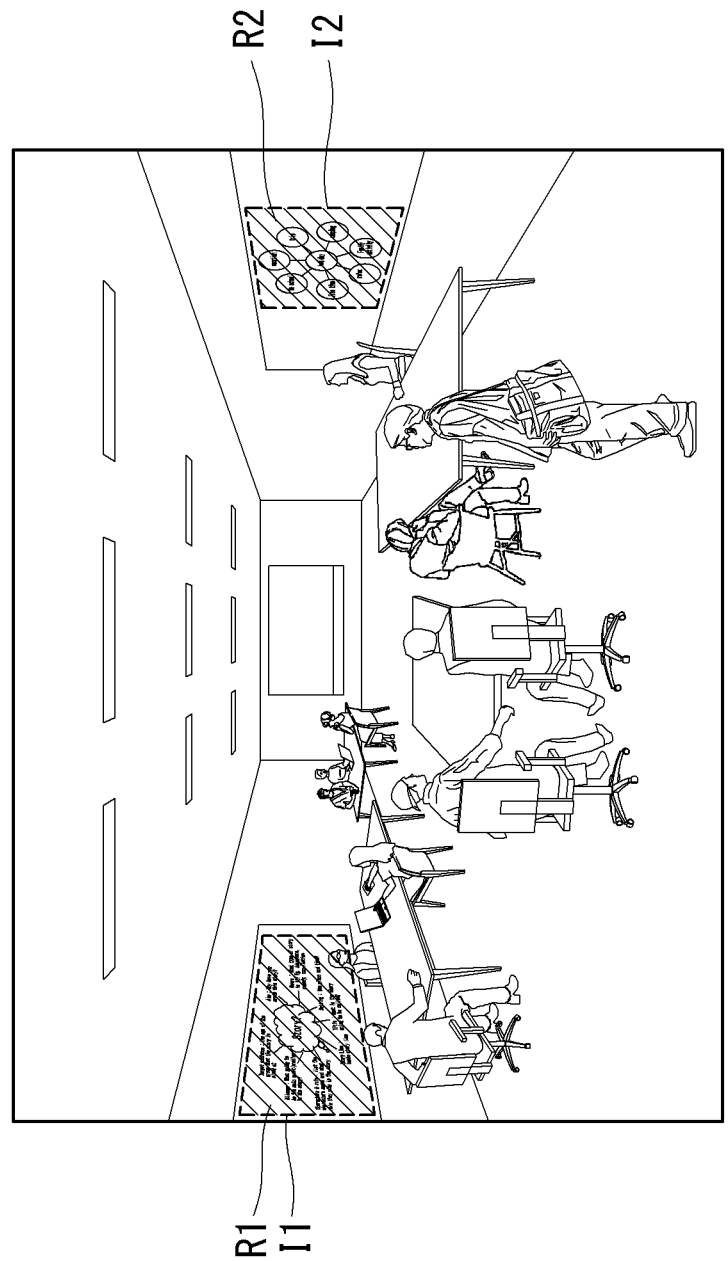

FIGS. 11A and 11B are diagrams for describing an example of displaying an image captured according to the first embodiment of the present invention through the gallery application Referring to FIG. 11A, the controller 180 may provide at least one image captured using a camera by executing the gallery application to the touchscreen 151. In this case, the perfect shot 41 captured after recognition of the ROIs may be displayed together with a predetermined indicator 51.

Referring to FIG. 11B, upon reception of input for selecting the perfect shot 41 from a gallery view, the controller 180 may display indicators I1 and I2 for indicating the positions of the ROIs R1 and R2 for a predetermined time in order to indicate that the perfect shot 41 having the zoomed in ROIs has been captured.

FIGS. 12 to 14B are diagrams for describing an example of re-capturing an ROI according to the first embodiment of the present invention.

Figure 12:
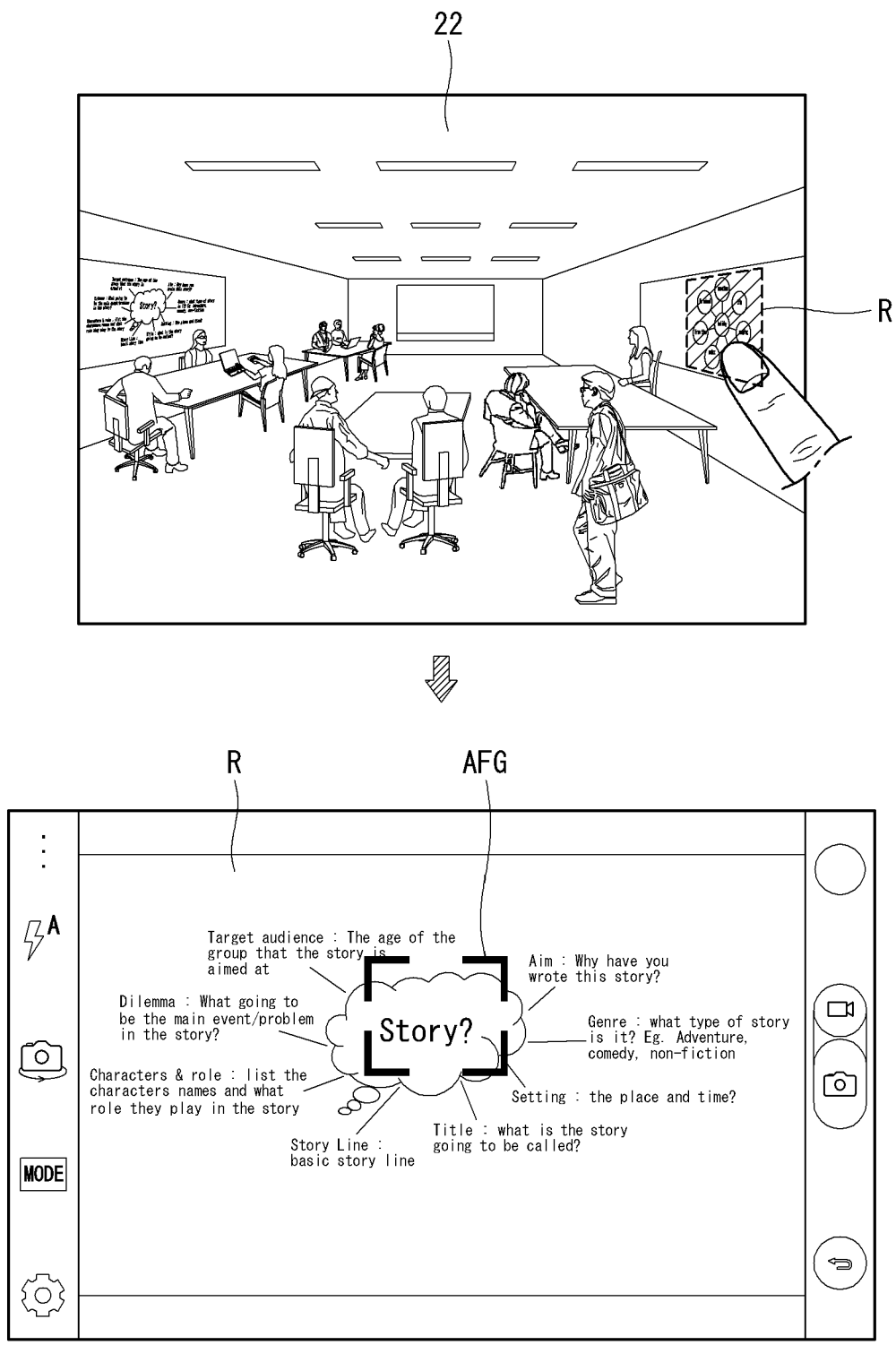
FIGS. 12 to 14B are diagrams for describing an example of re-capturing a region of interest according to the first embodiment of the present invention.

Referring to FIG. 12, when an image 22 is captured in the normal mode to which the first embodiment of the present invention is not applied, the controller 180 may execute the gallery application to display the image 22. The controller 180 may designate a region as an ROI to be re-captured. That is, the controller 180 may receive predetermined input for selecting an ROI R in the captured image 22. The predetermined input may be long touch input applied to the ROI R.

The controller 180 may automatically execute the camera application in response to the long touch input and provide an image R' acquired by zooming in on the ROI R as a preview image. The controller 180 may perform autofocusing on the ROI R and display an autofocus guide AFG on the touchscreen on which the ROI is displayed.

When the ROI is not recognized in the preview image although the controller 180 designates the ROI in the captured image through the gallery application and automatically executes the camera application, the controller 180 may automatically terminate the camera application.

That is, the first embodiment of the present invention can additionally designate an ROI in a specific image provided through a gallery view and execute the camera application for re-capturing the designated ROI.

Figure 13A:
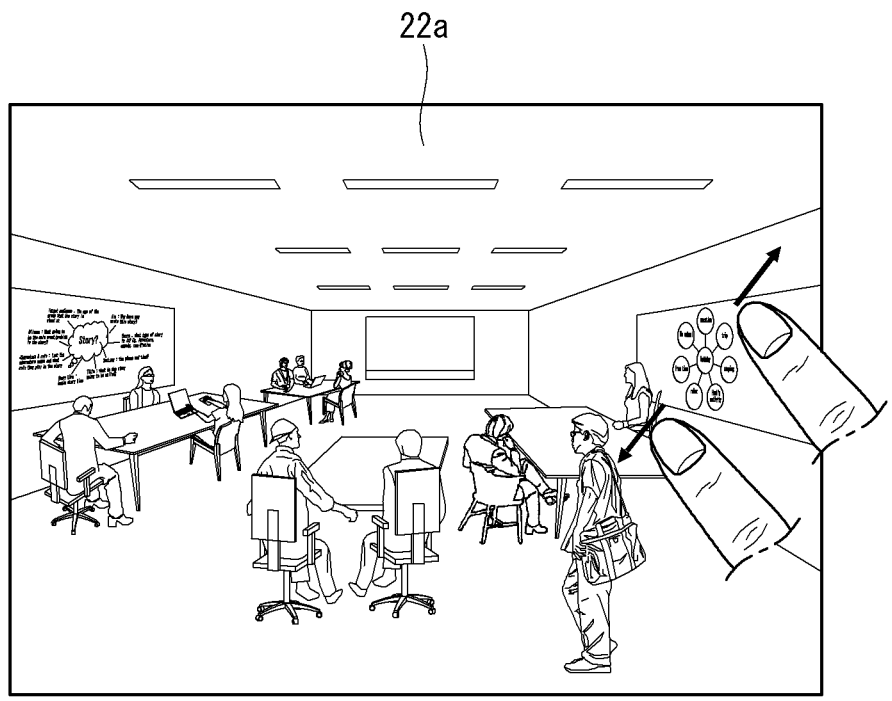
Figure 13A:
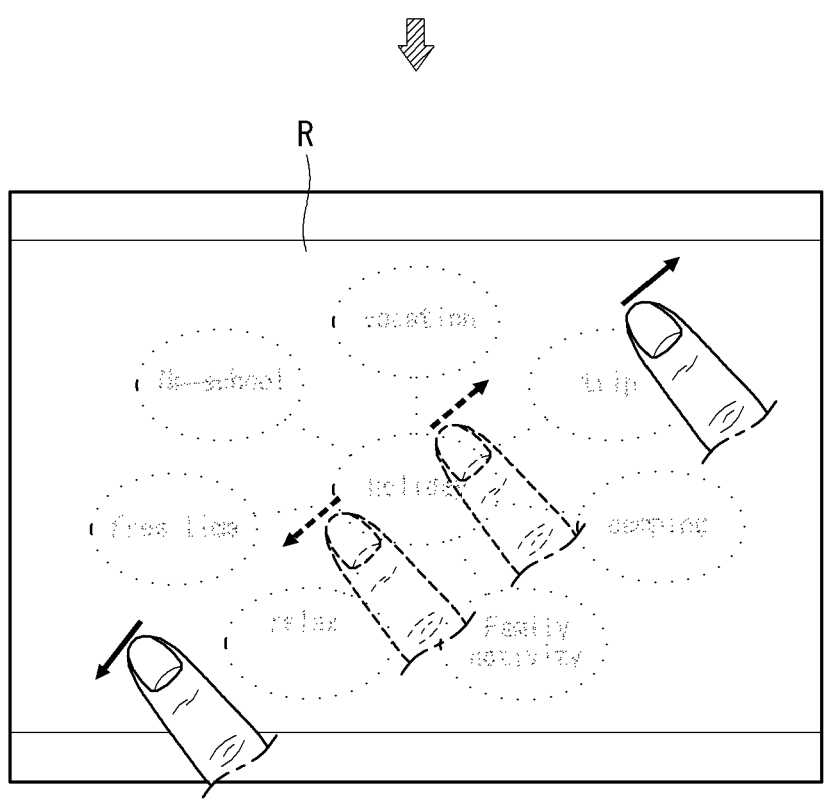

Referring to FIG. 13A, the controller 180 may provide an image 22*a* captured in the normal mode to which the first embodiment of the present invention is not applied through a gallery view. The controller 180 may magnify a specific region R in the image 22*a* by a predetermined magnification and display the magnified region on the touchscreen 151 in response to input for zooming in on the specific region (e.g., pinch zoom input).

Here, when multiple zoom-in inputs are sequentially applied, the controller 180 may magnify the image through sequential zooming operations according to the multiple zoom-in inputs. The controller 180 may execute the camera application when the multiple zoom-in inputs are last zoom-in input and thus digital zooming operation is no longer performed.

That is, upon reception of continuous zoom-in inputs applied to a specific region of an image, the controller 180 can recognize the zoom-in inputs as user's intention to re-capture the specific region.

In the example of FIG. 13A, when a zooming gesture is applied to an image, which has been captured without a process of applying the DIS technique to an ROI and zooming in on the ROI in an image capture process, until the ROI cannot be additionally magnified through the repeatedly input zoom gesture, the controller 180 can recognize that the user intends to re-capture the ROI.

A description will be given of operation of controlling display of a perfect shot according to gesture input (e.g., zooming operation, flicking input or the like) applied to the perfect shot after the perfect shot is generated according to an embodiment of the present invention.

Figure 13B:
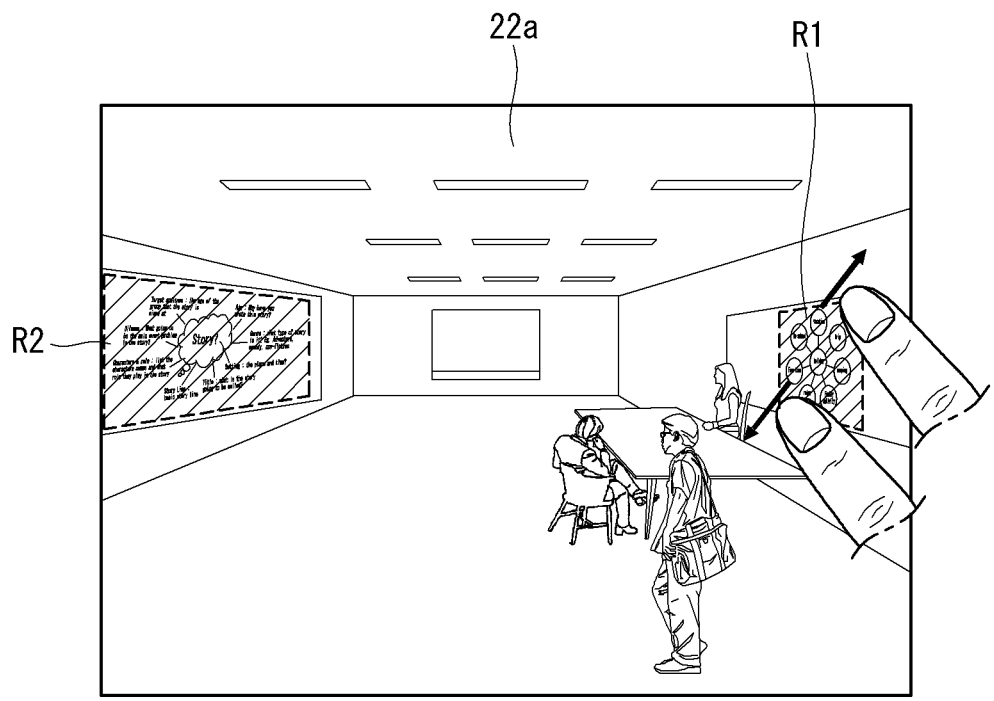
Figure 13B:
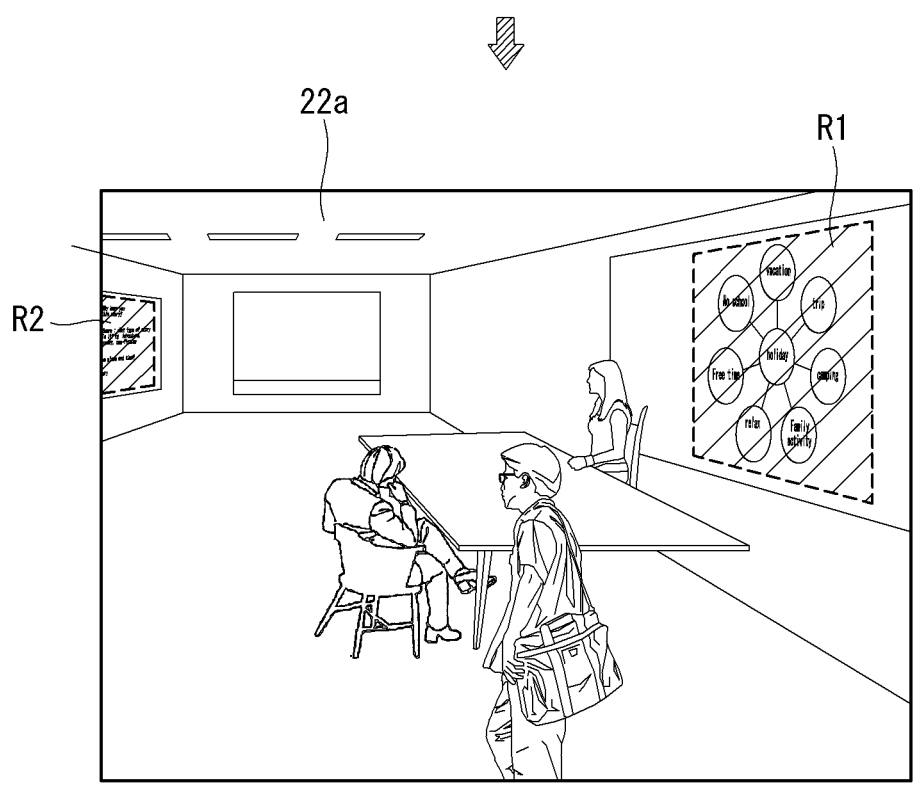

Referring to FIG. 13B, it is possible to indicate that the perfect shot 22*a* includes an image, which is generated by zooming in on the first ROI R1 and substitutes the ROI R1, using a predetermined indicator (e.g., by changing and displaying display characteristics of the ROI).

In the case of an image which is not a perfect shot, as shown in FIG. 13A, no indicator may be displayed.

Figure 13C:
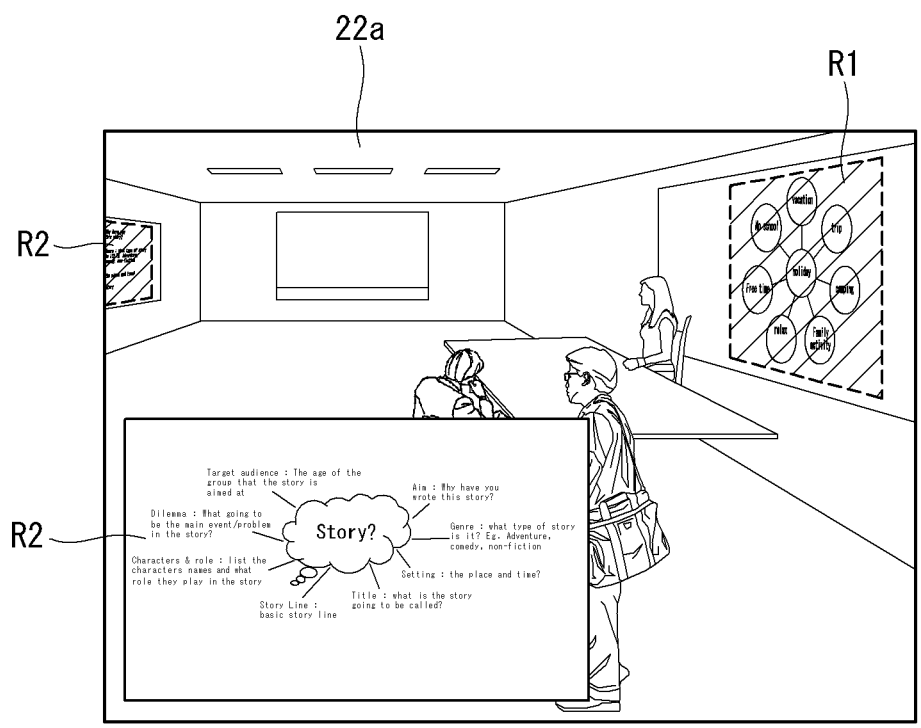

Referring back to FIG. 13B, the controller 180 may display the perfect shot 22*a* including the first ROI R1 and the second ROI R2 to which the same zoom magnification has been applied. Specifically, the first ROI R1 is located on the right side of the perfect shot 22*a* and the second ROI R2 is located on the left side of the perfect short 22*a*. When zoom input applied to the first ROI R1 on the right side is received, the first ROI RI is magnified whereas the second ROI R2 on the left side may gradually disappear from the screen. When a predetermined percentage of the second ROI R2 disappears from the screen, the controller 180 may magnify the second ROI R2 and provide the magnified second ROI R2 as a pop-up window, as shown in FIG. 13C.

That is, the controller 180 may determine that the user is interested in the first ROI R1 and the second ROI R2 in the perfect shot 22*a*, and when the first ROI R1 and the second ROI R2 disappear from the screen, additionally provide the ROIs as a pop-up window in display of the perfect shot 22*a*.

Figure 13D:
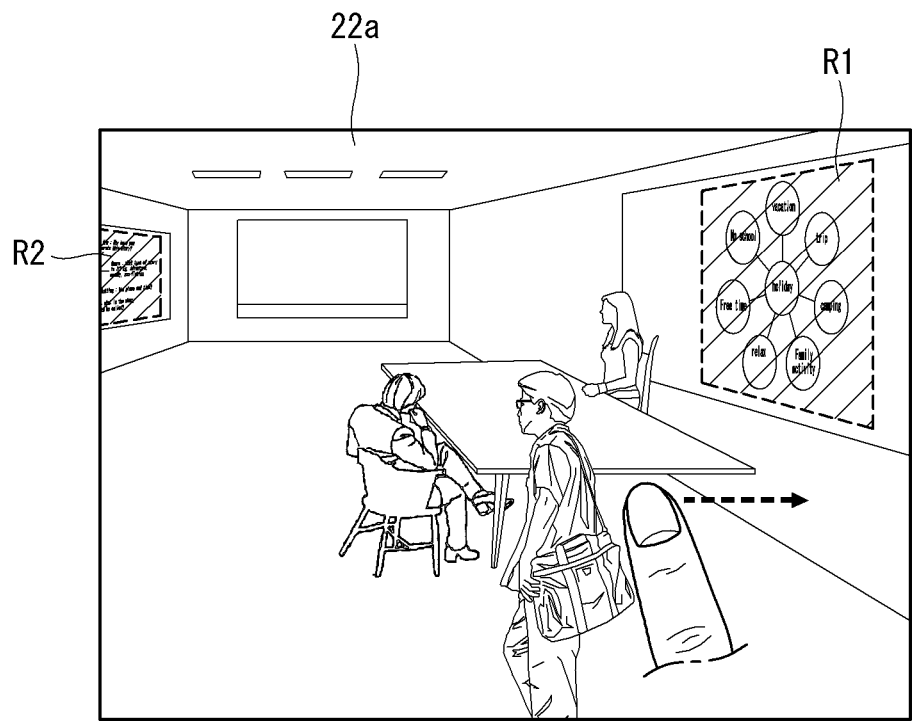
Figure 13D:
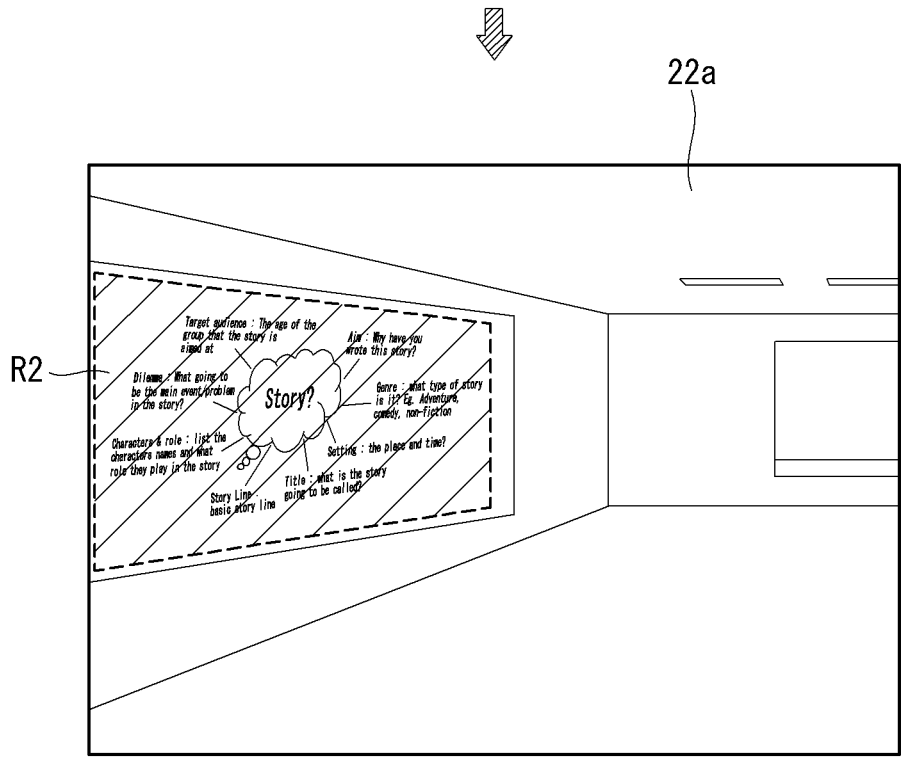

Referring to FIG. 13D, when input of dragging the screen to the right is received after the first ROI R1 on the right side has been zoomed in, the controller 180 may control the second ROI R2 on the left side to gradually appear on the screen. Here, the controller 180 may magnify the second ROI R2 by the same magnification as that of the right ROI R1.

Operation of displaying the perfect shot 22*a* when zoom input applied to the ROIs in the perfect shot 22*a* is received has been described with reference to FIGS. 13A to 13D. However, the present invention is not limited thereto. That is, when zoom input applied to a point (object) other than ROIs in the perfect shot 22a is received, the method of displaying an ROI can be modified in various manners.

Figure 13E:
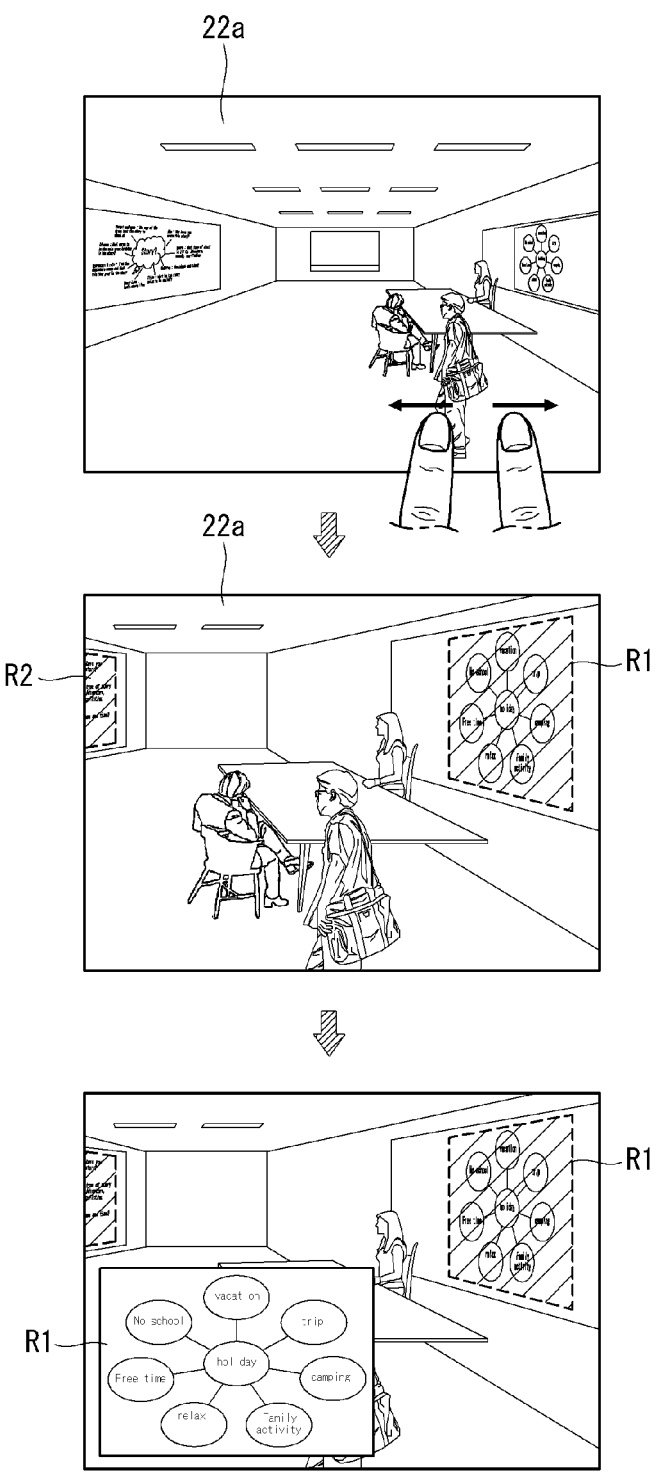
Figure 13F:
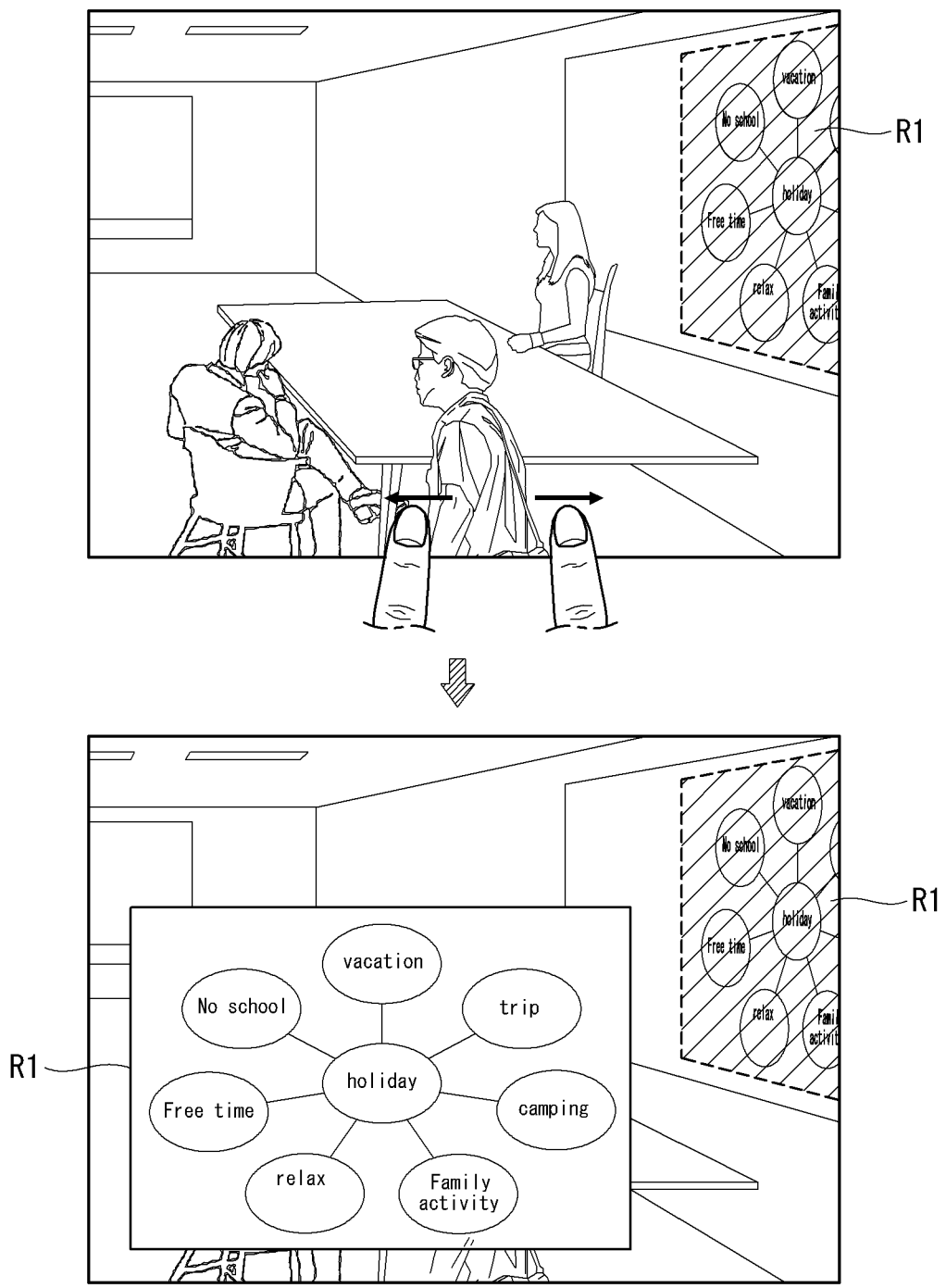

For example, referring to FIG. 13E, zoom input on the basis of a person in the perfect shot 22a may be received. The person may be close to the first ROI R1 on the right side and far from the second ROI R2 on the left side. The controller 180 magnifies the perfect shot 22a on the basis of the person according to the zoom input (or sequentially applied zoom inputs). Here, while the first ROI R1 may be magnified and continuously displayed on the screen, the second ROI R2 gradually disappears from the screen. In this case, the controller 180 may provide a zoom-image of the second ROI R2 as a pop-up window.

In FIG. 13E, when zoom input applied to the person in the perfect shot 22a is received again, the first ROI R1 may also disappear from the screen. In this case, the controller 180 may provide a zoom-image of the first ROI R1 as a pop-up window when at least part of the first ROI R1 disappears.

In the process of providing the ROIs in the perfect shot 22a as pop-up windows, the controller 180 may gradually magnify the ROIs by gradually increasing a magnification, and when the ROIs exceeds a predetermined size, provide the ROIs as pop-up windows.

Figure 13G:
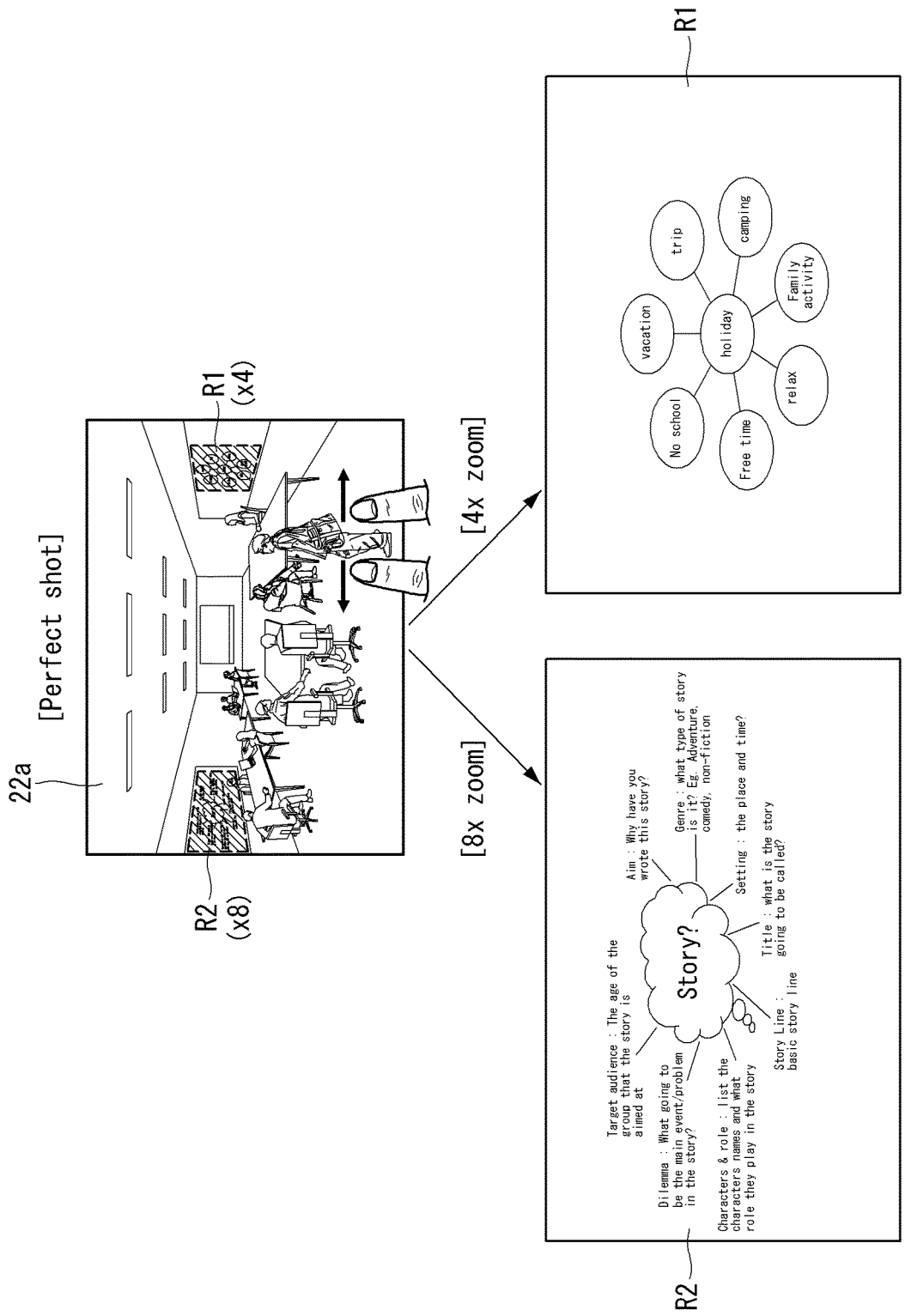

Referring to FIG. 13G, the first ROI R1 and the second ROI R2 included in the perfect shot 22a may be images generated by applying different magnifications thereto. For example, it is assumed that the first ROI R1 is zoomed in by 4× and the second ROI R2 is zoomed in by 8× to form the perfect shot 22a. When zoom input applied to a region (e.g., a person) other than the ROIs R1 and R2 is received and the zoom input is input for 4× zoom, the controller 180 may magnify the first ROI R1 and display the magnified first ROI R1 in the entire area of the touchscreen 151. When the zoom input corresponds to input for 4× zoom, the controller 180 may magnify the second ROI R2 and display the magnified second ROI R2 in the entire area of the touchscreen 151.

That is, when an ROI is zoomed in by a specific magnification and captured in a process of generating a perfect shot according to an embodiment of the present invention, the generated perfect shot can substantially realize digital zoom by the specific magnification.

Figure 13H:
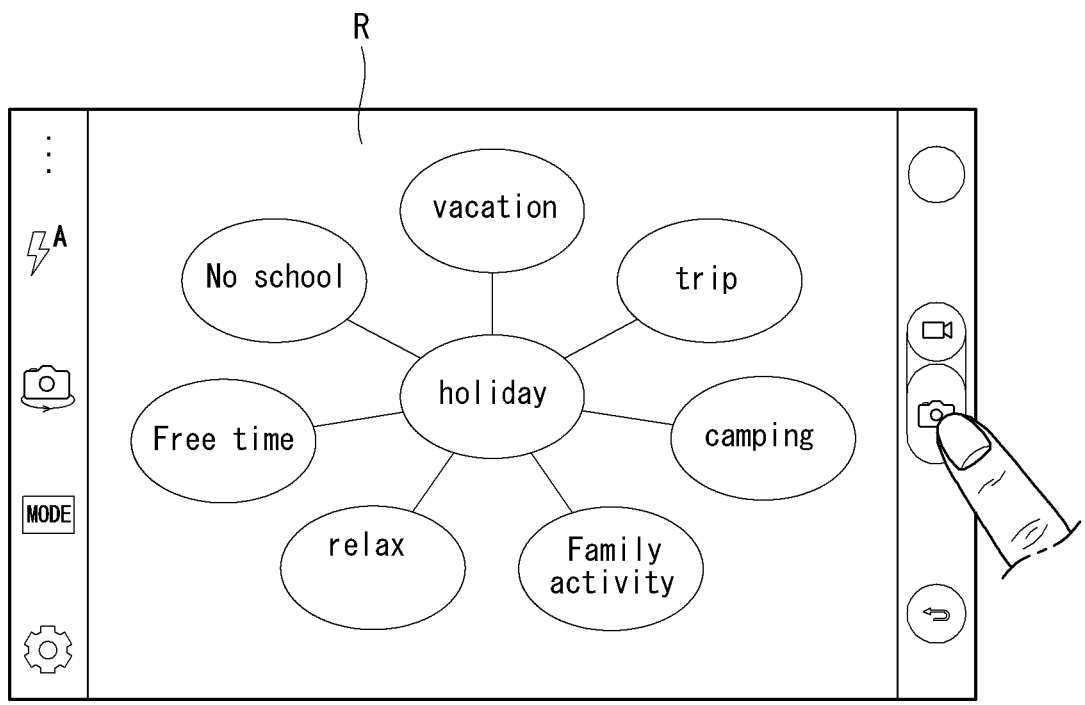
Figure 13H:
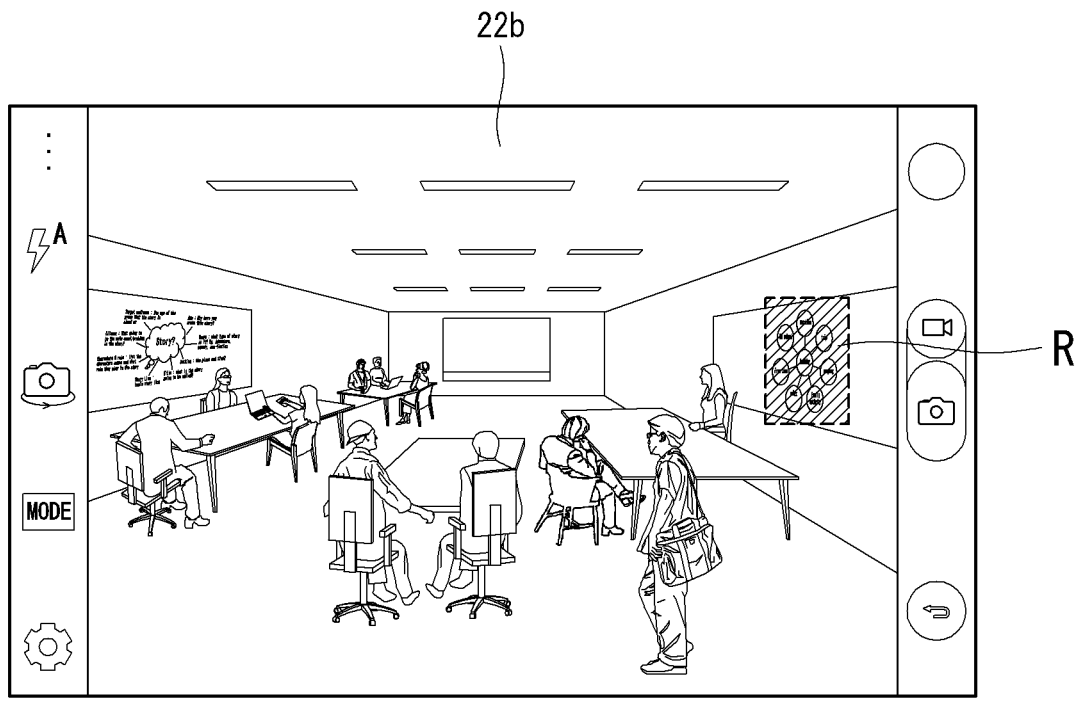

Referring to FIG. 13H, when the camera application is executed according to the aforementioned zoom-in input, the controller 180 may perform autofocusing on the ROI R and display a zoomed in image Ron the touchscreen 151.

Upon reception of a capture command, the controller 180 may capture the front view image through the camera and insert a zoomed in image acquired by re-capturing the ROI R into the ROI of the front view image to display the front view image and the zoomed in image of the ROI R as one image.

Operation of generating a perfect shot using a rear camera of the mobile terminal has been described. Although the above-described examples have been described on the assumption that the rear camera is a single camera, the present invention is not limited thereto.

For example, the mobile terminal 100 may implement the embodiments of the present invention using a dual camera provided to the rear side thereof, as shown in FIG. 1C. That is, the first rear camera 121b may capture a wide angle image including a main object from a front view image and the second rear camera 121c may acquire a telephoto image including a zoomed in image of the main object in the front view image. Accordingly, upon recognition of a predetermined ROI in the wide-angle image acquired through the first rear camera 121b, the controller 180 may perform zooming operation on the recognized ROI through the second rear camera 121c.

Figure 14A:
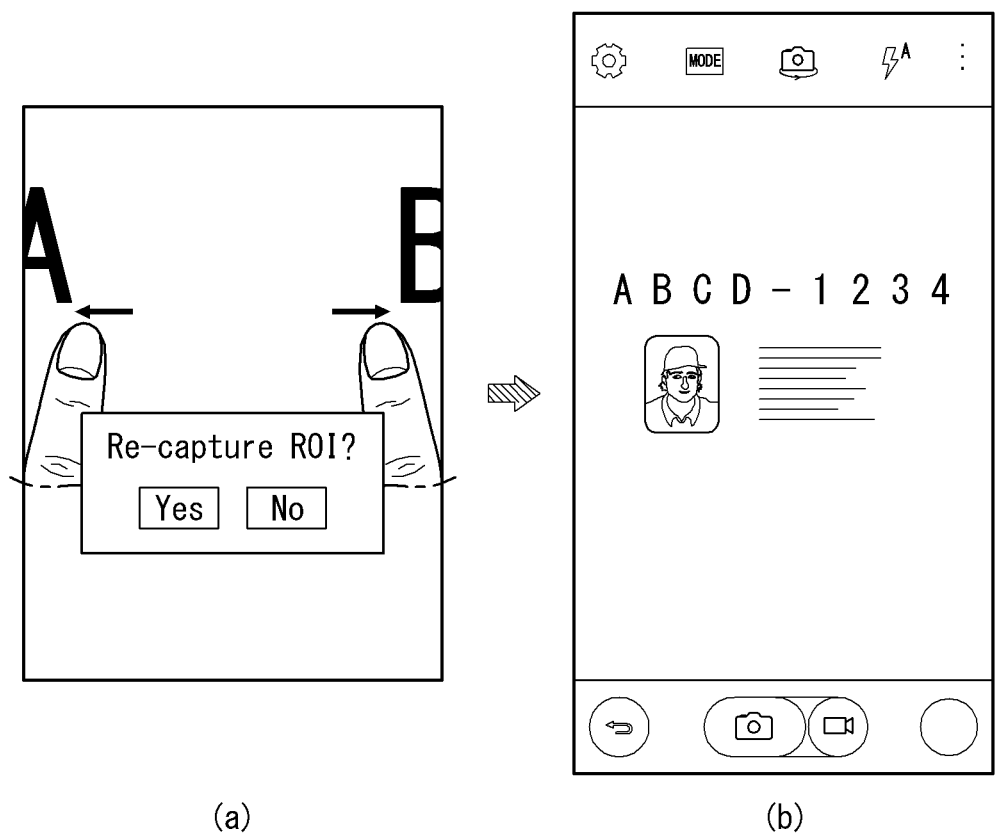

Referring to FIG. 14A, the controller 180 may receive zoom-in input for zooming in on a captured image. When the captured image is magnified to a maximum size, the controller 180 may execute the camera application such that a desired region is re-captured. The controller 180 may display a pop-up window for inquiring about whether to re-capture the ROI on the touchscreen 151.

The camera 180 may execute the camera application to recognize the region to which the zoom-in input is applied as an ROI, perform autofocusing on the ROI and provide a zoomed in image of the ROI as a preview image.

Figure 14B:
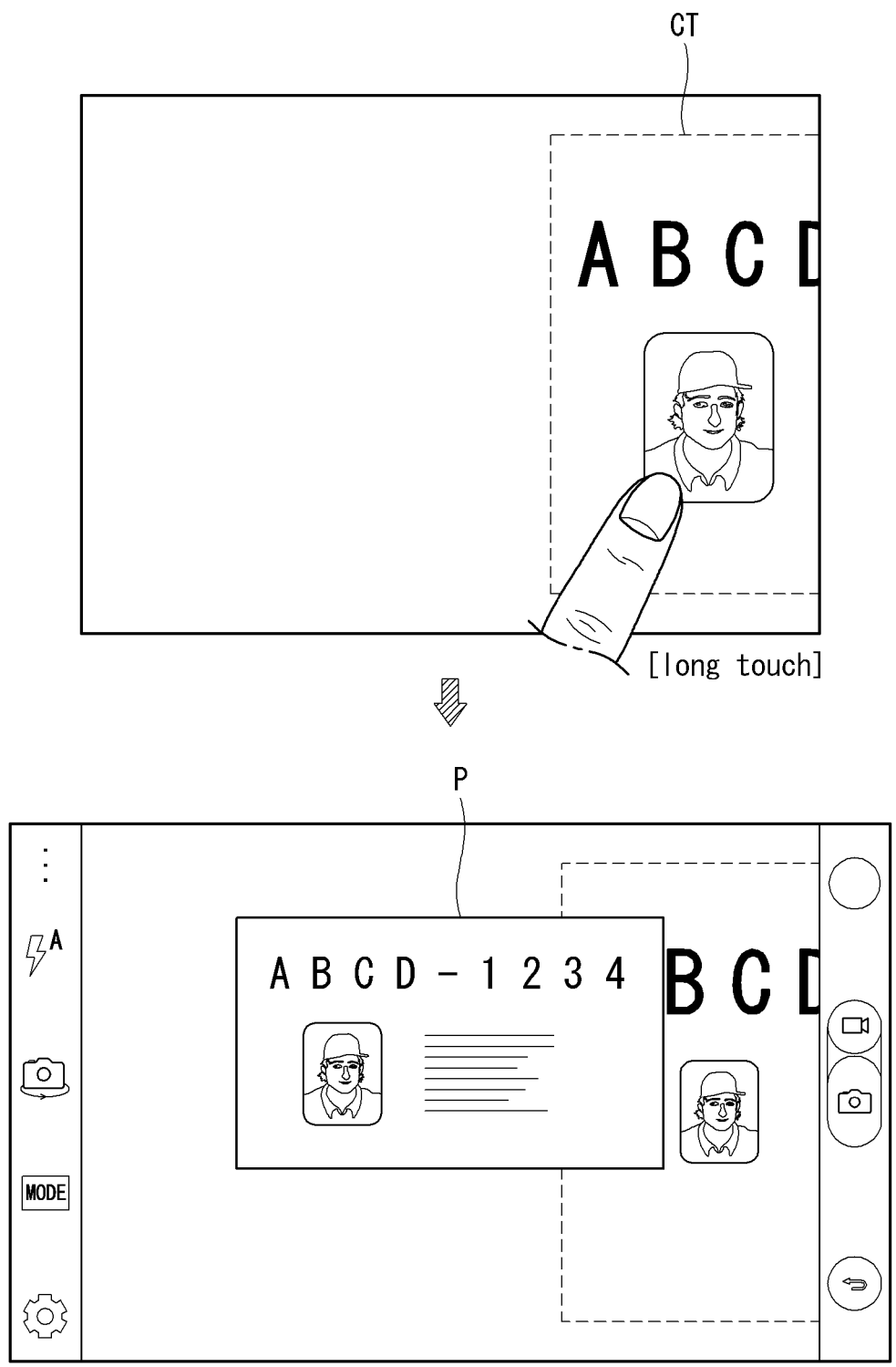

Referring to FIG. 14B, in a state in which at least part of an image is cropped and displayed in a process of providing captured images through a gallery view, the controller 180 may receive predetermined touch input (e.g., long touch input) applied to the cropped region CT.

When the entire image including the cropped region CT is stored, the controller 180 may provide the entire image as a pop-up window P.

When the entire image including the cropped region CT is not present, the controller 180 may re-execute the camera application to re-capture the cropped region CT. The controller 180 may perform autofocusing on the entire image including the cropped region CT and re-capture the zoomed image.

Figure 15:
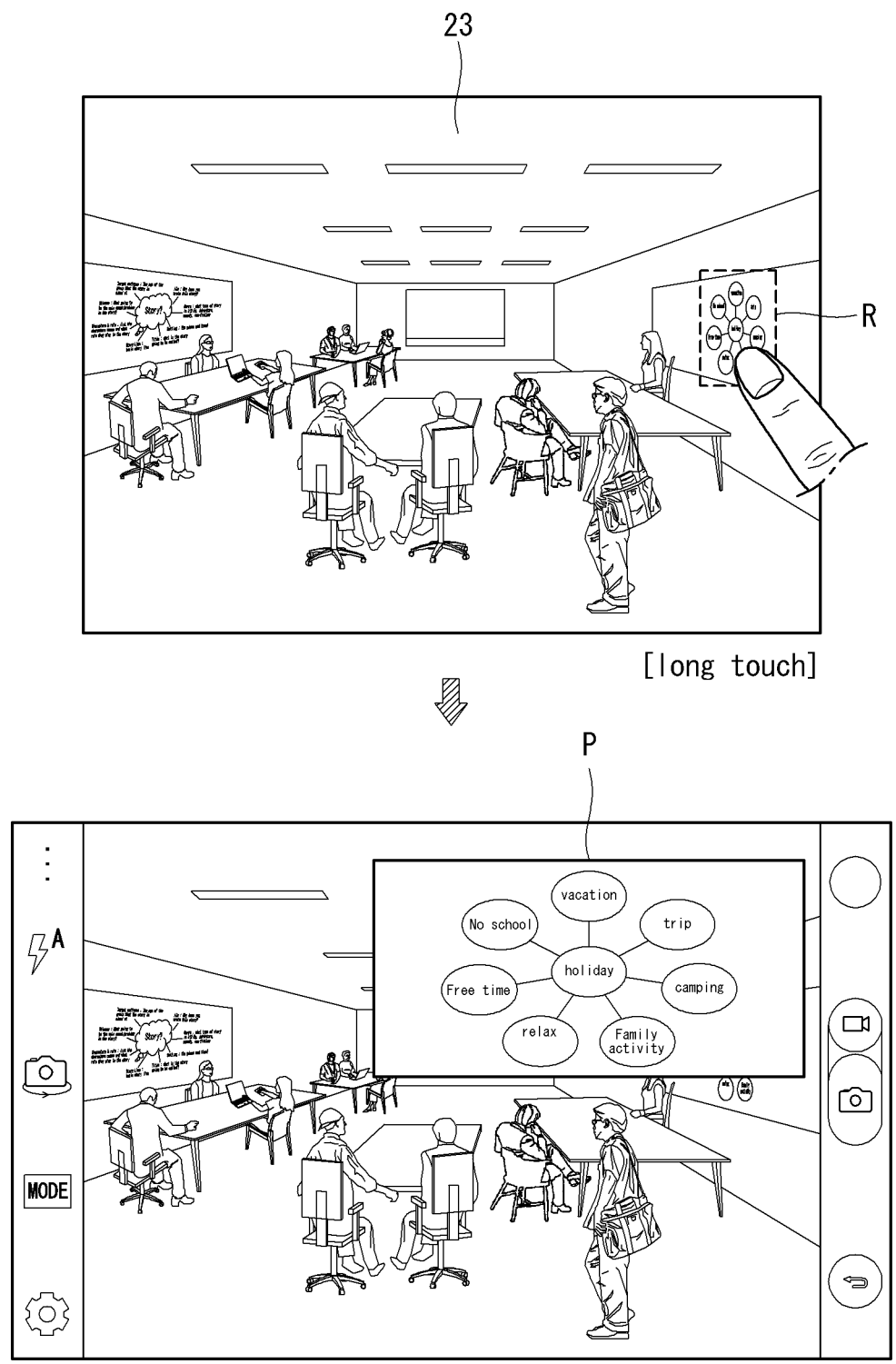
FIG. 15 is a diagram for describing another example of displaying a captured region of interest according to the first embodiment of the present invention.

Referring to FIG. 15, the controller 180 may display an image 23 which includes an automatically generated zoomed in image of an ROI and is stored on the touchscreen 151. To confirm the zoomed in image of the ROI R in the image 23 displayed on the touchscreen 151, long touch input applied to the ROI R may be received. The controller 180 may provide an image including the ROI R which has been zoomed in and re-captured as a pop-up window P.

The process of zooming in/out an ROI to generate a zoomed image, storing the zoomed image and providing the stored image through a gallery view has been described. In the first embodiment of the present invention, an image captured through the rear camera provided to the rear side of the mobile terminal 100 has been described. However, the mobile terminal 100 of the present invention may include a dual camera. A process of modifying the first embodiment of the present invention using the dual camera provided to the rear side of the mobile terminal 100 will be described through a second embodiment.

Figure 16:
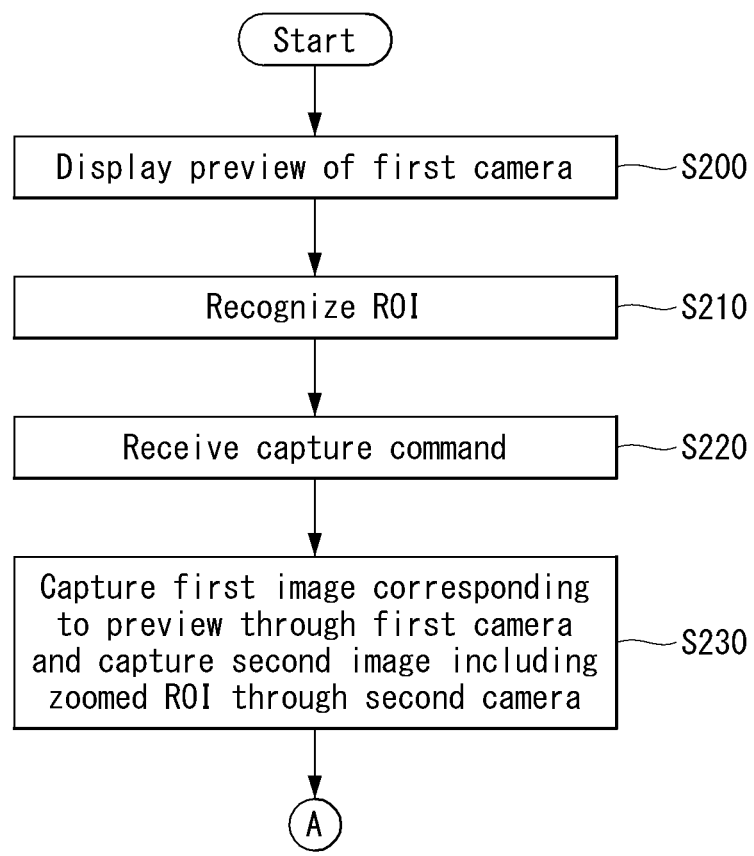
FIG. 16 is a flowchart illustrating a method of controlling a mobile terminal according to a second embodiment of the present invention.
Figure 17:
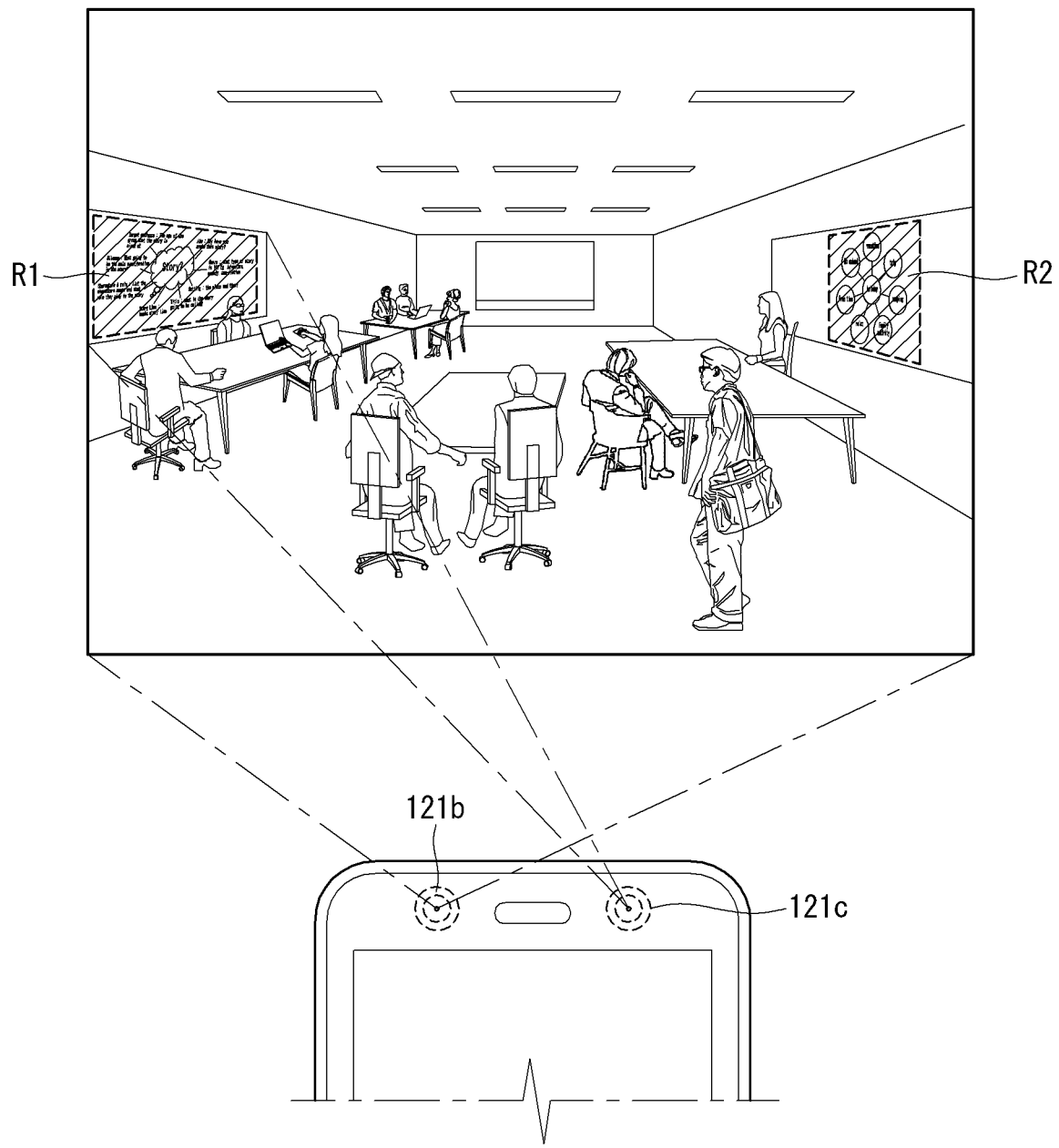
FIG. 17 is a diagram for describing the concept of capturing a region of interest using a rear dual camera according to the second embodiment of the present invention.

FIG. 16 is a flowchart illustrating a method of controlling a mobile terminal according to the second embodiment of the present invention and FIG. 17 is a diagram for describing the concept of capturing an ROI using a dual camera provided to the rear side of the mobile terminal according to the second embodiment of the present invention.

The method of controlling a mobile terminal according to the second embodiment of the present invention may be implemented in the mobile terminal described above with reference to FIGS. 1A to 2. A description will be given of the method of controlling a mobile terminal according to the second embodiment of the present invention and operations of the mobile terminal 100 to implement the same with reference to the attached drawings. The second embodiment of the present invention may be implemented on the basis of the first embodiment or implemented by being combined with at least part of the first embodiment.

Referring to FIG. 16, the controller 180 may display a preview acquired through a first camera provided to the rear side of the mobile terminal 100 on the touchscreen 151 (S200).

Upon execution of the camera application, the controller 180 may select a mode for capturing an image using at least one of the first camera (121b of FIG. 1C) and the second camera (121c of FIG. 1C) among a plurality of rear cameras. For example, the controller 180 may display a pop-up window for inquiring about whether to activate the second camera on the touchscreen 151 while basically providing a preview according to the first camera upon execution of the camera application.

The first camera 121b provided to the rear side of the mobile terminal may be a wide angle camera. The first camera 121b may be applied in order to capture a front view image of the mobile terminal 100 at a wider angle. The second camera 121c may include a telephoto lens and thus have a narrower angle than that of the first camera 121b. The second camera 121c may be applied in order to zoom in on a specific region in the front view image provided through the first camera 121b.

Alternatively, when a moving object is detected from a front view image while the front view image is acquired through the first camera 121b, the controller 180 may activate the second camera 121c to zoom in on the moving object and generate an image tracking the moving object. That is, when the velocity of a dynamic object in the preview image provided through the first camera 121b is equal to or higher than a predetermined velocity, the controller 180 may zoom in on the dynamic object and capture a moving image through the second camera 121c. The velocity may be calculated by performing a vector operation on the motion of the dynamic object. That is, the controller 180 may track displacement of the dynamic object to determine whether to recognize the dynamic object as an ROI.

The controller 180 may recognize an ROI during while displaying the preview through the first camera (S210).

Upon recognition of the ROI in the preview provided through the first camera, the controller 180 may activate the second camera in order to capture the ROI. Alternatively, the controller 180 may simultaneously activate the first camera and the second camera, acquire the front view through the first camera and recognize an ROI in an image corresponding to the front view through the second camera.

The method of recognizing the ROI is not limited to the above-described example and may be modified and embodied in various manners. For example, when a capture command is received in a state in which the preview image is displayed through the first camera, the controller 180 may activate the second camera and control the second camera to recognize an ROI. In this case, an image acquired through the first camera may be captured and, simultaneously, the ROI may be captured through the second camera according to the capture command. A first image captured through the first camera and a second image captured through the second camera may be combined into one file and stored, or stored as respective video files, as described above.

The controller 180 may receive a capture command during acquisition of the preview through the first camera (S220).

The controller 180 may capture the first image corresponding to the preview through the first camera and capture the second image acquired by zooming in on an ROI through the second camera in response to the capture command (S230).

The operation described in the first embodiment of the present invention may be applied as operation of capturing at least one image through the first camera and/or the second camera, displaying the image and re-capturing an ROI.

Referring to FIG. 17, a preview image may be acquired through the first camera 121b provided to the rear side of the mobile terminal 100 and ROIs R1 and R2 may be recognized through the second camera 121c. The ROIs R1 and R2 may include text regions, persons, low-definition regions which are not easily recognized by the user, and the like, as described above.

The second embodiment of the present invention may be applied to a case in which a moving image is captured.

Figure 18A:
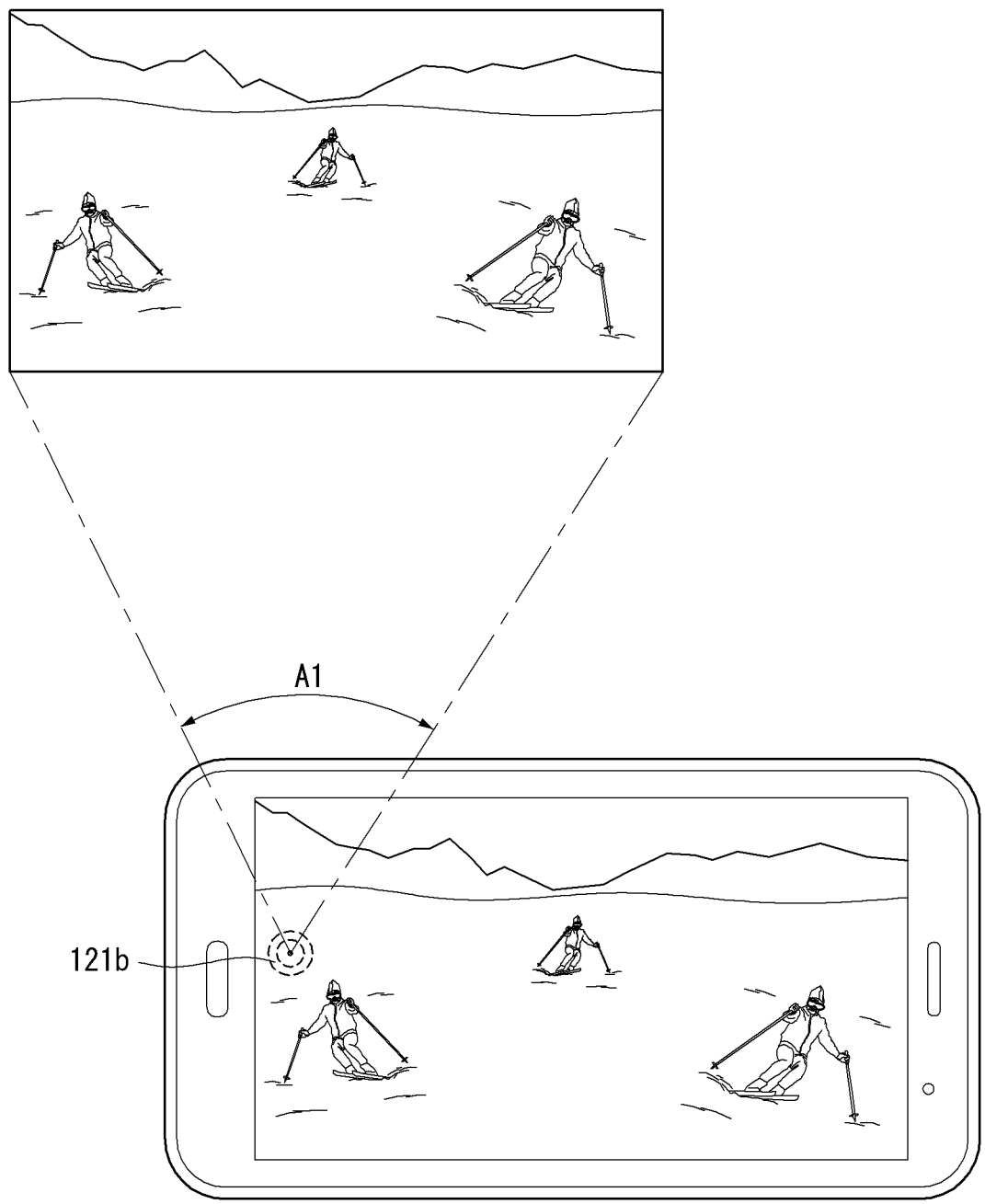
FIGS. 18A to 19 are diagrams for describing the second embodiment of the present invention.
Figure 18B:
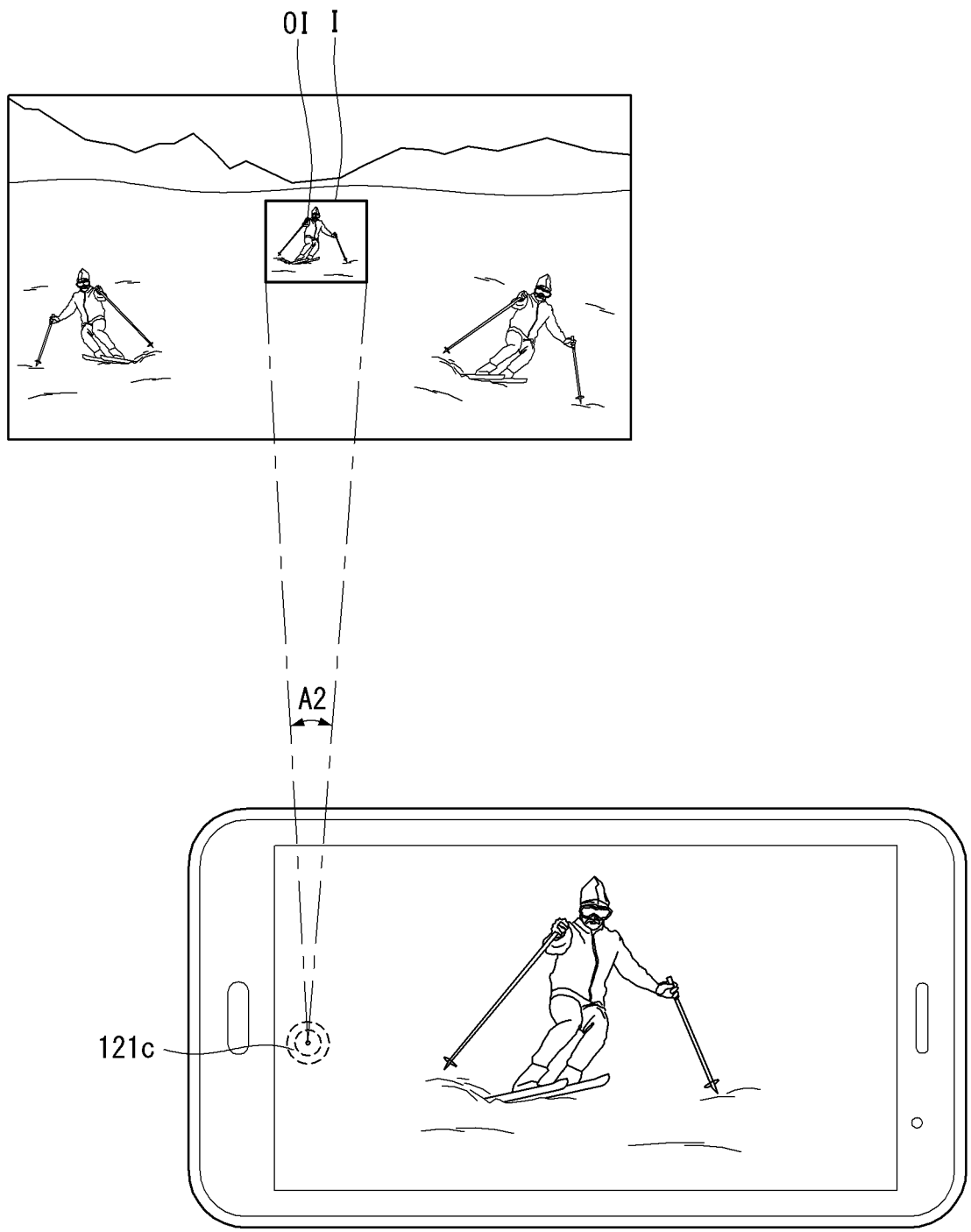
Figure 19:
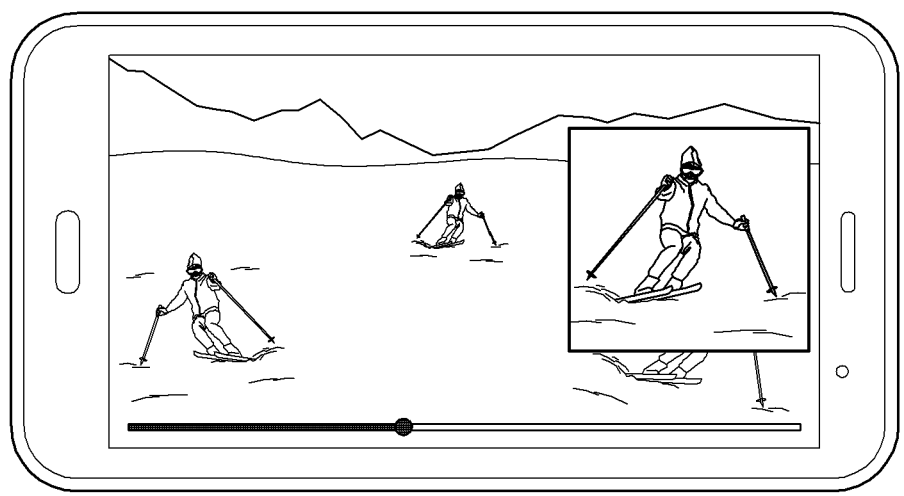

FIGS. 18A to 19 are diagrams for describing the second embodiment of the present invention may be applied to a case in which a moving image is captured.

Referring to FIG. 18A, the controller 180 of the mobile terminal 100 may acquire a wide angle image using the first camera 121b provided to the rear side of the mobile terminal 100. The first camera 121b may capture a front view at an angle A1 of about 30° to 80°. The controller 180 may capture a moving image through the first camera 121b to acquire a streaming image.

Referring to FIG. 18B, the controller 180 may recognize an ROI OI during acquisition of the front view image through the first camera 121b. The ROI OI may be a dynamic object, and the dynamic object may be recognized as the ROI OI through one of the first camera 121b and the second camera 121c.

The controller 180 may zoom in on the dynamic object through the second camera 121c and display the zoomed in dynamic object on the touchscreen 151 upon reception of the ROI OI. The second camera 121c may generate a zoomed image at a narrower angle A2 than the angle of the first camera 121b, for example, 30° to 80°.

The first image acquired through the first camera and the image acquired through the second camera may be combined into one file and stored, or stored as individual files, as described above.

According to the second embodiment of the present invention, when the velocity of a dynamic object exceeds a predetermined velocity while a moving image including the dynamic object is captured through the first camera 121b, it is possible to recognize the dynamic object as an ROI, zoom in on the ROI and capture the moving image.

Referring to FIG. 19, when the moving image captured through the first camera is reproduced, the controller 180 may display a progress bar indicating progress of image reproduction on the touchscreen 151. When a zoomed image is acquired through the second camera in a specific reproduction period, the controller 180 may display the zoomed image acquired through the second camera such that at least part of the zoomed image overlaps with the reproduced moving image acquired through the first camera in the specific reproduction period.

According to an embodiment of the present invention, when an ROI is recognized while a preview image acquired through a camera is displayed on the touchscreen 151, the controller 180 may out-focus the preview image on the basis of the ROI.

According to an embodiment of the present invention, in management of a capture image corresponding to a preview image acquired through a camera and a zoomed image generated by zooming in/out an ROI, the zoomed image may be associated with the capture image. For example, when input for deleting the capture image is received, the zoomed image associated with the capture image may also be deleted.

In addition, when the controller 180 receives input for sharing the capture image, the zoomed image may be automatically shared.

Furthermore, when the controller 180 receives input for sharing the capture image, only the zoomed image instead of the capture image may be shared. Image sharing may include a procedure of transmitting content to a counterpart through a messenger application or a procedure of uploading content to an SNS application.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
    at least one or two cameras;
    a memory;
    a touchscreen for displaying a preview image obtained by executing the camera; and
    a controller configured to:
        automatically recognize a plurality of ROIs (Region Of Interests), R1, R2 and R3 required zoom-in processing in the preview image;
        display at least a corresponding one of a plurality of indicators I1, I2 and I3 at borders of each separate one of the ROIs on the preview image to indicate recognition of the ROIs;
        receive a first capture command;
        generate captured images of the preview image and zoom-in images of the plurality of ROIs upon receiving the first capture command; and
        store, in the memory, the captured images,
        wherein the preview image includes at least one object including a person, a background, an object and text,
        wherein the controller is further configured to:
        execute a text recognition function while the preview image is displayed on the touchscreen,
        recognize a region including the text in the preview image as the ROI, when a recognition rate of the text included in the preview image is lower than a predetermined value, and
        apply magnification to the ROIs based on a distance between each separate one of the ROIs and the mobile terminal,
        wherein the controller is further configured to:
        execute a text recognition function while the preview image is displayed on the touchscreen,
        recognize a region including the text in the preview image as the ROI, when the recognition rate of the text included in the preview image is lower than a predetermined value, and
        apply same magnification to only a first ROI R1 and a second ROI R2, when a first distance between the first ROI R1 and the mobile terminal is same as a second distance between the second ROI R2 and the mobile terminal, and a third distance between a third ROI R3 and the mobile terminal is different from the first distance and second distance,
        wherein the controller is further configured to:
        apply different magnification to each of the first ROI R1, the second ROI R2 and the third ROI R3 depending on quantities and sizes of text and objects included in each of the ROIs even if the distances between the ROIs and the mobile terminal are identical, and
        apply first zoom magnification XL of the camera to first zoomed image Z11 of the first ROI R1 which is bigger than second zoom magnification ×M applied to second zoomed image Z12 of the second ROI R2 when the second ROI R2 includes more quantities and sizes of text and objects than the first ROI R1.

2. The mobile terminal according to claim 1, wherein the third distance between the third ROI R3 and the mobile terminal is longer than the first distance, and the third distance is longer than the second distance.

3. The mobile terminal according to claim 2, wherein the controller is configured:
    such that the first and second zoom magnification of the camera applied on the first and second distance is same, and third zoom magnification of the camera applied on the third distance is bigger than the first and second zoom magnification.

4. The mobile terminal according to claim 1, wherein the controller is configured to:
    provide an entire image of a cropped region CT as a pop-up window P when the entire image including the cropped region CT is stored in the memory; or
    execute the camera to re-capture the cropped region CT when the entire image of the cropped region CT is not present and perform autofocusing on the entire image including the cropped region CT and re-capture the zoomed image of the cropped region CT.

5. The mobile terminal according to claim 1, wherein the controller is configured to:
    provide a normal image captured in a normal mode;
    magnify a specific region R in the normal image by a predetermined magnification; and
    display the magnified specific region R on the touchscreen in response to input for zooming in on the specific region R.

6. The mobile terminal according to claim 5, wherein the controller is configured to:

magnify the normal image through sequential zooming operations according to the multiple zoom-in inputs; and recognize the multiple zoom-in inputs as user's intention to re-capture the specific region; and execute the camera application when the multiple zoom-in inputs are last zoom-in input and thus digital zooming operation is no longer performed.

7. The mobile terminal according to claim 1, wherein the mobile terminal is an eyeglasses-type, and wherein the controller is further configured to:

track a view point movement of a user while the preview image is provided to a left and right glasses; and detect that the view point movement of the user stops at a specific point for a predetermined time to designate the specific point as the ROI.

8. The mobile terminal according to claim 1, wherein the controller is configured to:

analyze an image capture pattern of a user of the mobile terminal, and recommend the ROI in consideration of previous captured images captured by the user and locations frequently used by the user.

* * * * *